United States Patent
Nishida et al.

(10) Patent No.: US 10,261,380 B2
(45) Date of Patent: Apr. 16, 2019

(54) LATERAL ELECTRIC FIELD TYPE LIQUID CRYSTAL DISPLAY DEVICE

(71) Applicant: NLT Technologies, Ltd., Kanagawa (JP)

(72) Inventors: Shinichi Nishida, Kanagawa (JP); Chikaaki Mizokuchi, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 0 days.

(21) Appl. No.: 13/863,728

(22) Filed: Apr. 16, 2013

(65) Prior Publication Data

US 2013/0286308 A1  Oct. 31, 2013

(30) Foreign Application Priority Data

Apr. 27, 2012  (JP) ................. 2012-102113

(51) Int. Cl.
    G02F 1/1343  (2006.01)
    G02F 1/139   (2006.01)
    G02F 1/1337  (2006.01)

(52) U.S. Cl.
    CPC ........ *G02F 1/139* (2013.01); *G02F 1/133707* (2013.01); *G02F 1/134363* (2013.01); *G02F 2001/133757* (2013.01)

(58) Field of Classification Search
    CPC ......... G02F 1/134363; G02F 1/136286; G02F 1/1343; G02F 2001/134345;
    (Continued)

(56) References Cited

U.S. PATENT DOCUMENTS 7,495,734 B2   2/2009  Suzuki
8,405,802 B2 * 3/2013  Hanaoka et al. ............. 349/100
               (Continued)

FOREIGN PATENT DOCUMENTS

CN    1181517 A      5/1998
JP    10-307295     11/1998
              (Continued)

OTHER PUBLICATIONS

Japanese Office Action dated Nov. 10, 2015 in corresponding Japanese Patent Application No. 2012-102113 with English translation of Japanese Office Action.
(Continued)

*Primary Examiner* — Nathanael R Briggs
*Assistant Examiner* — William D Peterson
(74) *Attorney, Agent, or Firm* — Young & Thompson

(57) ABSTRACT

To stabilize the alignment direction in the boundary between two regions in a structure in which a pixel includes two regions where the initial alignment directions of the liquid crystal are orthogonal to each other. A pixel is divided into a first region, a second region, and a boundary region between those regions. The initial alignment directions of the liquid crystal in the first region and the second region are orthogonal to each other, the extending directions of the pixel electrode in the first region and the second region are also orthogonal to each other. The extending direction of the pixel electrode in the first region meets the pixel electrode of the second region when extended. The initial alignment direction of the liquid crystal in the boundary region is a direction rotated in a same rotating direction from the initial alignment direction of the first region at an acute angle.

8 Claims, 21 Drawing Sheets

(58) Field of Classification Search
CPC ........ G02F 2001/134318; G02F 2001/134372; G02F 1/133707; G02F 1/139; G02F 2001/133757; G09G 3/3648
USPC .................. 349/141, 149, 139, 151, 100
See application file for complete search history.

(56) References Cited

U.S. PATENT DOCUMENTS

| | | | |
|---|---|---|---|
| 2003/0081163 A1* | 5/2003 | Suzuki et al. | 349/139 |
| 2010/0079712 A1* | 4/2010 | Tanaka et al. | 349/123 |
| 2011/0267571 A1 | 11/2011 | Lee | |
| 2012/0075541 A1* | 3/2012 | Kubo et al. | 349/33 |
| 2012/0075561 A1* | 3/2012 | Iwamoto et al. | 349/132 |

FOREIGN PATENT DOCUMENTS

| | | |
|---|---|---|
| JP | 2002-31804 | 1/2002 |
| JP | 2011-027886 | 2/2011 |

OTHER PUBLICATIONS

Chinese Office Action dated Aug. 2, 2016; Application No. 201310149412.7.

* cited by examiner

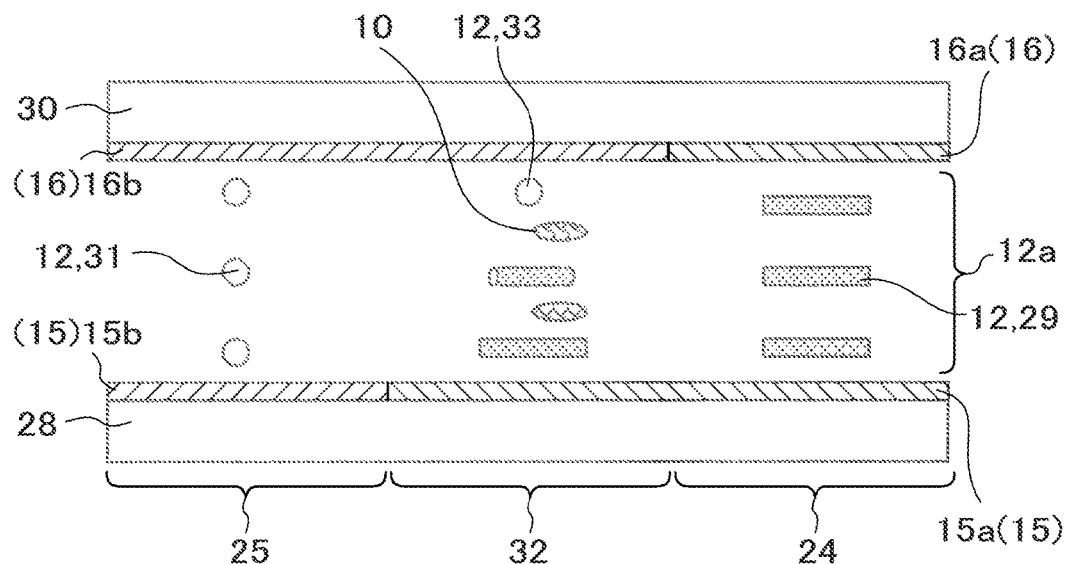
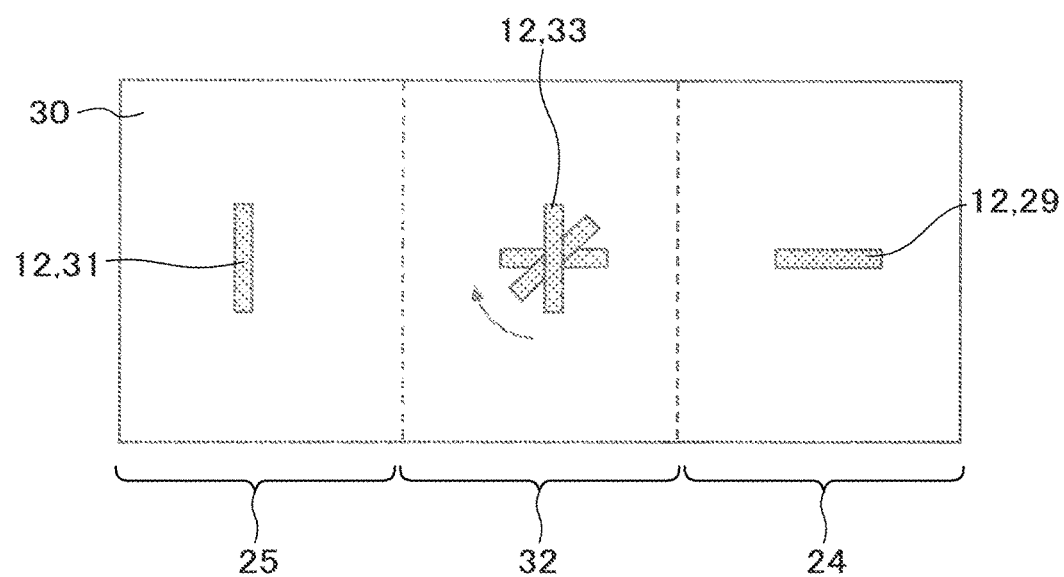

LATERAL ELECTRIC FIELD TYPE LIQUID CRYSTAL DISPLAY DEVICE

CROSS-REFERENCE TO RELATED APPLICATION

This application is based upon and claims the benefit of priority from Japanese patent application No. 2012-102113, filed on Apr. 27, 2012, the disclosure of which is incorporated herein in its entirety by reference.

BACKGROUND OF THE INVENTION

1. Field of the Invention

The present invention relates to a lateral electric field type liquid crystal display device which exhibits an excellent characteristic in the viewing angle property.

2. Description of the Related Art

While the widely used TN (Twisted Nematic) system can provide high contrast, there is also an issue that the visual angle dependency thereof is tremendous since the liquid crystal molecule axes are raised by the perpendicular electric field. Recently, there is a strong demand to acquire same picture qualities from any directions with large-scaled monitors of TV (television sets) as well as portable information terminals. In order to fulfill such demand, it has become popular to employ systems such as the IPS (In-plane Switching) and the FFS (Fringe field Switching), with which the liquid crystal is rotated in a plane that is almost in parallel to the substrate by applying a lateral electric field that is substantially in parallel to the substrate.

Those lateral electric field systems rotate the molecule axes of the nematic liquid crystal aligned horizontally within a plane that is in parallel to the substrate by using the lateral electric field. With the lateral electric field systems, it is possible to suppress changes in the picture quality caused depending on the viewing angle directions according to the rise of the liquid crystal molecule axes. Therefore, the viewing angle property can be improved.

In those liquid crystal display devices using the lateral electric field, Japanese Unexamined Patent Publication Hei 10-307295 (Patent Document 1) discloses a technique which suppresses coloring in two regions through disposing the two regions where the comb-like electrodes for generating the lateral electric fields are set to be orthogonal to each other and providing the two regions where the initial alignment directions of the liquid crystal are set to be orthogonal by corresponding thereto.

Further, Japanese Unexamined Patent Publication 2011-27886 (Patent Document 2) discloses a technique which, between the pixels, sets the pixel display region and the region between the pixels to be in different alignment states. However, there is no indication regarding a technique for stabilizing the alignment between the orthogonal alignment regions regarding the pixel divided into two orthogonal alignment regions described later in this Specification.

However, when the alignment directions of the liquid crystal within the pixel are set to be orthogonal to each other for improving the viewing angle, there may be cases where the alignment becomes unstable in the boundary between the two regions where the alignment directions are orthogonal to each other.

It is therefore an exemplary object of the present invention to provide a lateral electric field type liquid crystal display device with a structure that includes, within a pixel, two regions where the initial alignment directions of the liquid crystal are orthogonal to each other, which is excellent in the display uniformity and is capable of providing a stable display even for external disturbances such as finger pressures or the like by stabilizing the alignment direction in the boundary between those two regions.

SUMMARY OF THE INVENTION

The lateral electric field type liquid crystal display device according to an exemplary aspect of the invention is a lateral electric field type liquid crystal display device which includes two substrates opposing to each other, a liquid crystal layer which is sandwiched between the substrates and is constituted with liquid crystal aligned in a direction substantially in parallel to the substrates, and a linear electrode that generates a lateral electric field substantially in parallel to the substrates. The display device controls a display by rotating the liquid crystal in a plane substantially in parallel to the substrates by the lateral electric field, wherein: each pixel constituting the display is divided into a region I, a region II, and a boundary region between the region I and the region II; an initial alignment direction of the liquid crystal in the region I and an initial alignment direction of the liquid crystal in the region II are orthogonal to each other, an extending direction of the linear electrode in the region I and an extending direction of the linear electrode in the region II are orthogonal to each other, and the extending direction of the linear electrode of the region I comes to meet the linear electrode of the region II when extended; and an initial alignment direction of the liquid crystal in the boundary region is a direction rotated in a same rotating direction from the initial alignment direction of the region I at an acute angle.

BRIEF DESCRIPTION OF THE DRAWINGS

FIG. 15A is a longitudinal sectional view taken along line A-A' of FIG. 14;

FIG. 15B is a plan view of a part corresponding to FIG. 15A when viewed from a color filter substrate side;

DETAILED DESCRIPTION OF THE PREFERRED EMBODIMENTS

Figure 1:
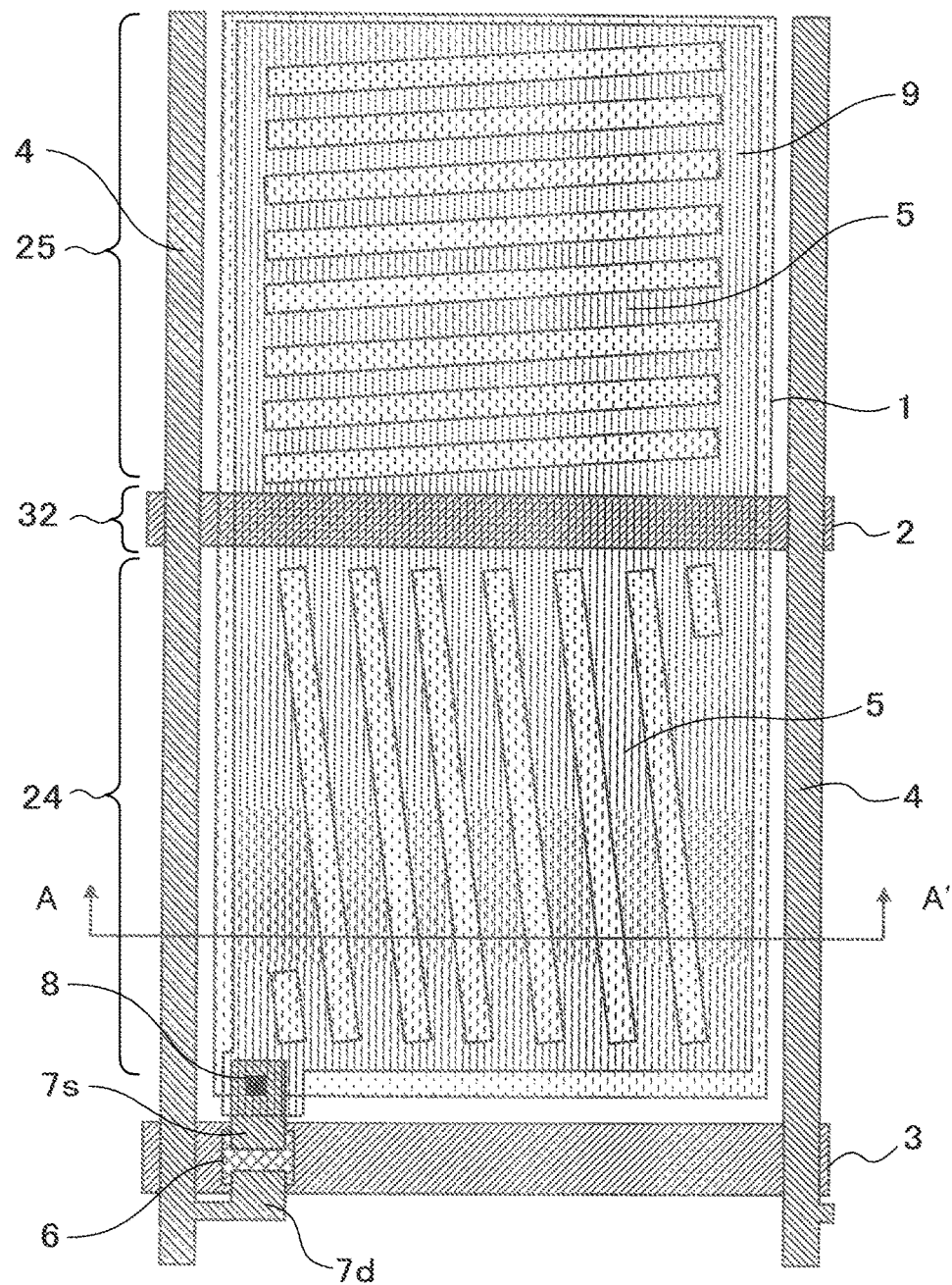
FIG. 1 is a plan view showing the structure of one pixel in a liquid crystal display device according to a first exemplary embodiment.

Hereinafter, modes for embodying the present invention (referred to as "exemplary embodiments" hereinafter) will be described by referring to the accompanying drawings. In this Specification and the drawings, same reference numerals are used for substantially the same structural elements. The shapes in the drawings are illustrated to be easily comprehended by those skilled in the art, so that the dimensions and ratios thereof do not necessarily correspond to actual ones.

Figure 19:
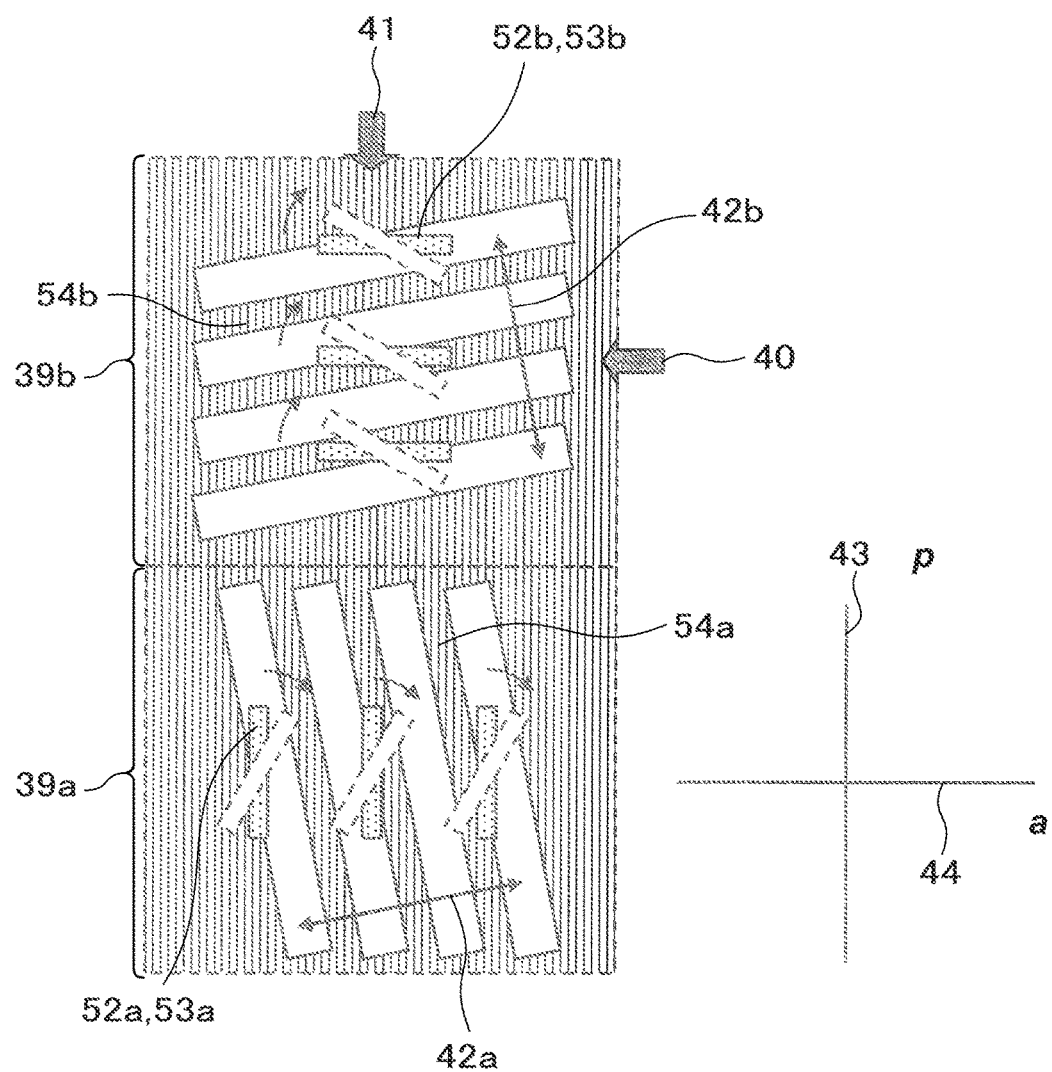
FIG. 19 is a plan view showing an alignment state of one pixel in the liquid crystal display device according to a related technique 1.
Figure 20A:
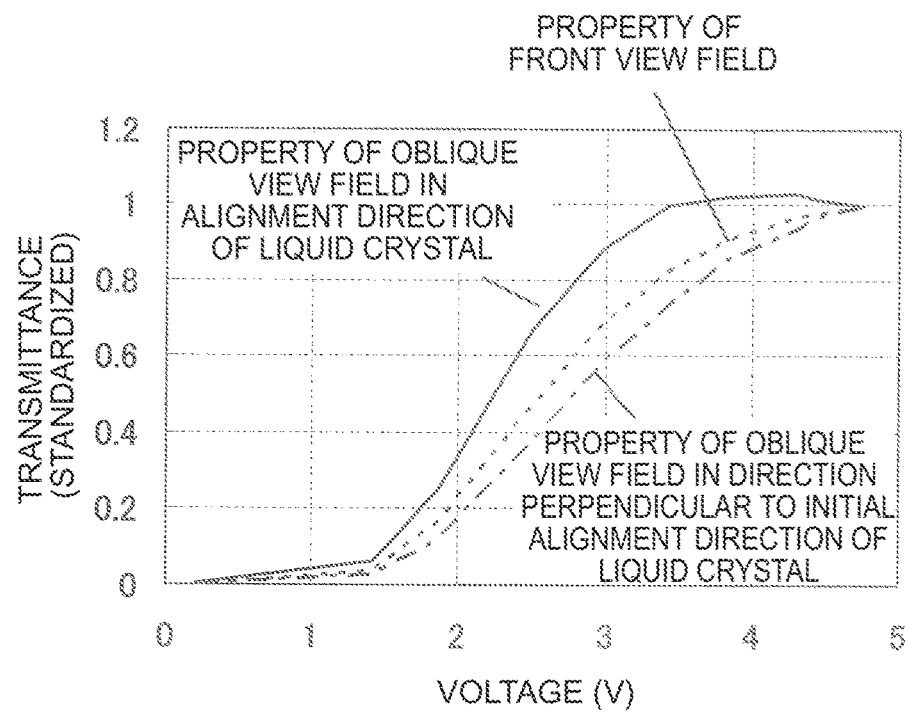
FIG. 20A is a graph showing the voltage-transmittance property of each region of the liquid crystal display device according to the related technique 1.
Figure 20B:
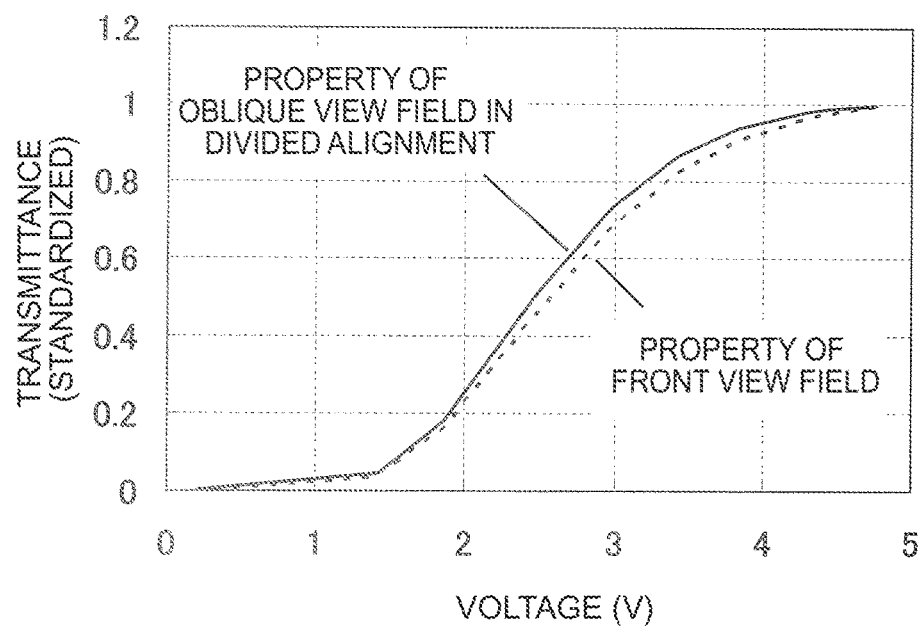
FIG. 20B is a graph showing the voltage-transmittance property of a case where two regions of the liquid crystal display device according to the related technique 1 are added.

First, FIG. 19 shows a related technique 1 (undisclosed) which suppresses the shift of the voltage-transmittance property. In the related technique 1, a pixel of an FFS-mode lateral electric field type liquid crystal display device is divided into two regions 39a as a region I and 39b as a region II, an initial alignment direction 53a of liquid crystal 52a of the region 39a is set to be orthogonal to an initial alignment direction 53b of liquid crystal 52b of the region 39b, the extending direction of a striped electrode 54a is set to be orthogonal to the extending direction of a striped electrode 54b so that a lateral electric field 42a becomes orthogonal to a lateral electric field 42b, and an angle formed between the striped electrode 54a and the initial alignment direction 53a and an angle formed between the striped electrode 54b and the initial alignment direction 53b are set to be equivalent. FIG. 19 discloses an oblique view field 40 of the initial alignment direction 53b, the oblique view field 40 in a direction orthogonal to the initial alignment direction 53a, an oblique view field 41 of the initial alignment direction 53a, the oblique view field 41 orthogonal to the initial alignment direction 53b, an absorption axis 43 of an incident-side polarization plate, an absorption axis 44 of an exit-side polarization plate, etc. With this, the liquid crystals 52a and 52b can be rotated while keeping the orthogonal state of the directions of the liquid crystals 52a, 52b of the two regions 39a, 39b when changing the transmittance by rotating the liquid crystals 52a, 52b by using the lateral electric fields 42a, 42b. As shown in FIG. 20A, the voltage-transmittance property shifts to the low-voltage side in the region 39b when viewed from the oblique view field 40 of the initial alignment direction 53b. Inversely, the voltage-transmittance property shifts to the high-voltage side when viewed from the oblique view field 41 that is in the direction orthogonal to the initial alignment direction 53b. This is the same also in the region 39a. In the meantime, by combining the two regions 39a and 39b as shown in FIG. 20B, the viewing angle properties of the both are leveled. Thereby, it can be made closer to the property almost equivalent to that of the front view even when viewed from the initial alignment directions 53a, 53b and the direction orthogonal to those.

Figure 21:
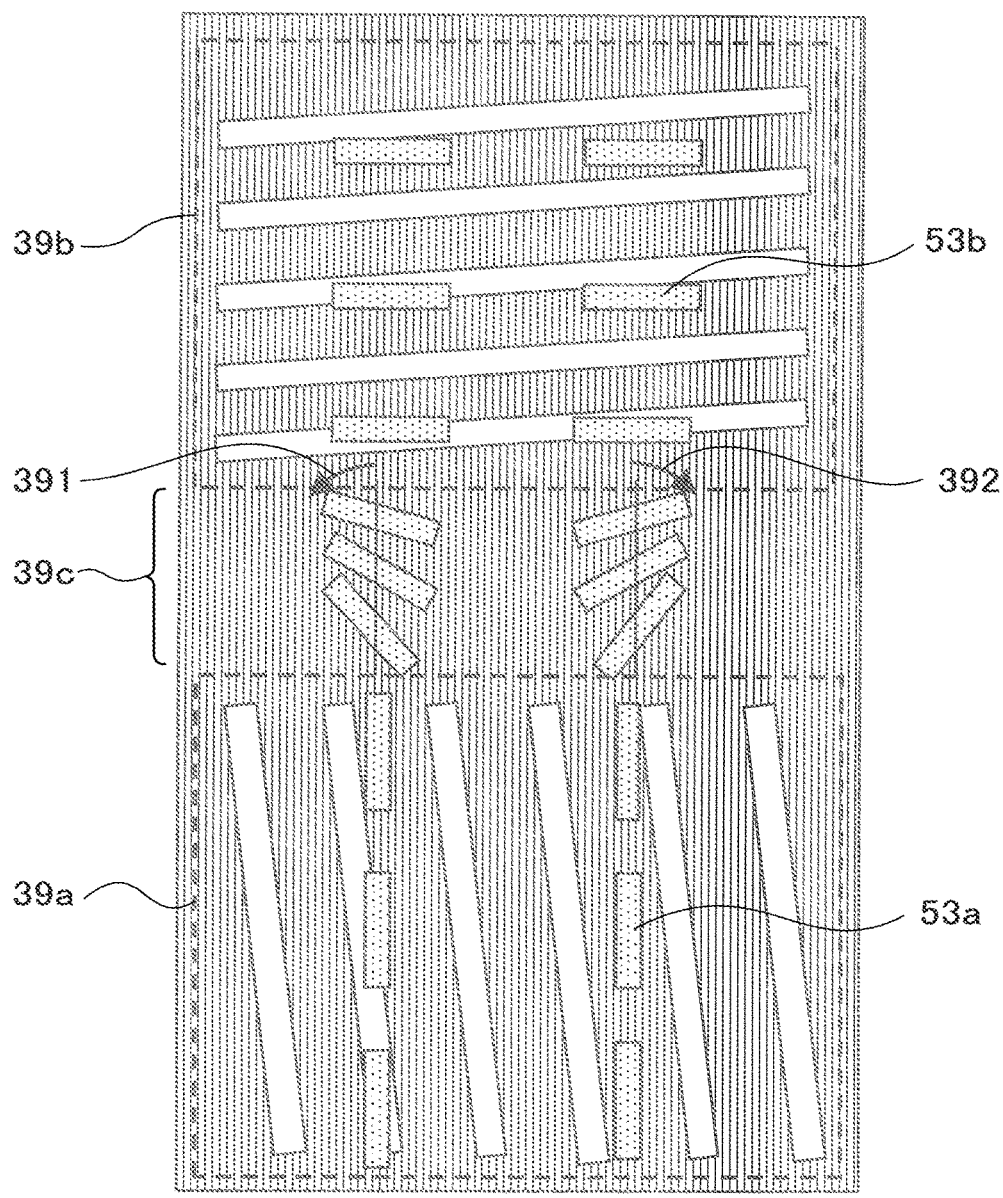
FIG. 21 is an enlarged plan view showing the alignment state of a boundary region and the vicinity thereof regarding one pixel in the liquid crystal display device according to the related technique 1.

FIG. 21 shows the alignment in the boundary region between the region I and the region II shown in FIG. 19. The initial alignment direction 53a of the region 39a as the region I and the initial alignment direction 53b of the region 39b as the region II are orthogonal to each other. Thus, in the boundary region 39c of those, there is generated deformation in the liquid crystal azimuths which continuously connect the initial alignment direction 53a and the initial alignment direction 53b. As such continuous liquid crystal azimuth deformation, there are a deformation 391 in which the liquid crystal azimuths are continuously connected while being rotated in the counterclockwise azimuth and a deformation 392 in which the liquid crystal azimuths are continuously connected while being rotated in the clockwise azimuth by having the initial alignment direction 53a of the region 39a shown in FIG. 21 as a reference. Those deformations 391 and 392 generate the equivalent liquid crystal deformation energy, so that the probabilities of having those are equivalent.

When the region I and the region II are formed within one pixel with a normal structure, there are the pixel having the clockwise deformation 392 of FIG. 21 and the pixel having the counterclockwise deformation 391. Those deformations 391 and 392 are generated in the area of the boundary region 39c that is normally light-shielded, so that those are not recognized as a direct display. However, a domain abnormality and the like generated when the display surface of the liquid crystal display device is pressed by a finger, for example, is likely to have the display abnormality remained depending on the pixels since the way of growth of the abnormal domain varies when the alignment of the boundary region 39c is different.

Further, how the liquid crystal between the boundary region and the region I is rotated and how the liquid crystal between the boundary region and the region II is rotated when the electric field is applied are influenced by the rotation of the liquid crystal in the boundary region. Thus, when the rotating direction in the boundary region varies for each pixel, the transmittance becomes slightly different for each pixel. This may cause a display abnormality such as a sense of roughness felt from the display.

Furthermore, when the continuity of the alignment is lost in the boundary region within one pixel due to a foreign matter, alignment abnormality, or the like, the rotating direction of the liquid crystal in the boundary region cannot become stable. In such case, the display of that pixel becomes unstable, which may result in causing a fault in terms of the reliability.

As described above, in the related technique 1, there is an issue that the display becomes unstable since there are two kinds of alignment in the boundary region.

It is therefore an exemplary object of the present invention to stabilize the alignment in the boundary region in the lateral electric field type liquid crystal display device having the orthogonal alignment and, further, to improve the uniformity of the display as well as to improve the stability and the like when the display surface is pressed by a finger through setting the desirable rotating direction. Thereby, acquired is a lateral electric field type liquid crystal display device having the orthogonal alignment, which can acquire a fine black display even when viewed from any viewing angles by suppressing the transmittance when viewed from oblique view fields at the time of black display.

First Exemplary Embodiment

Figure 2:
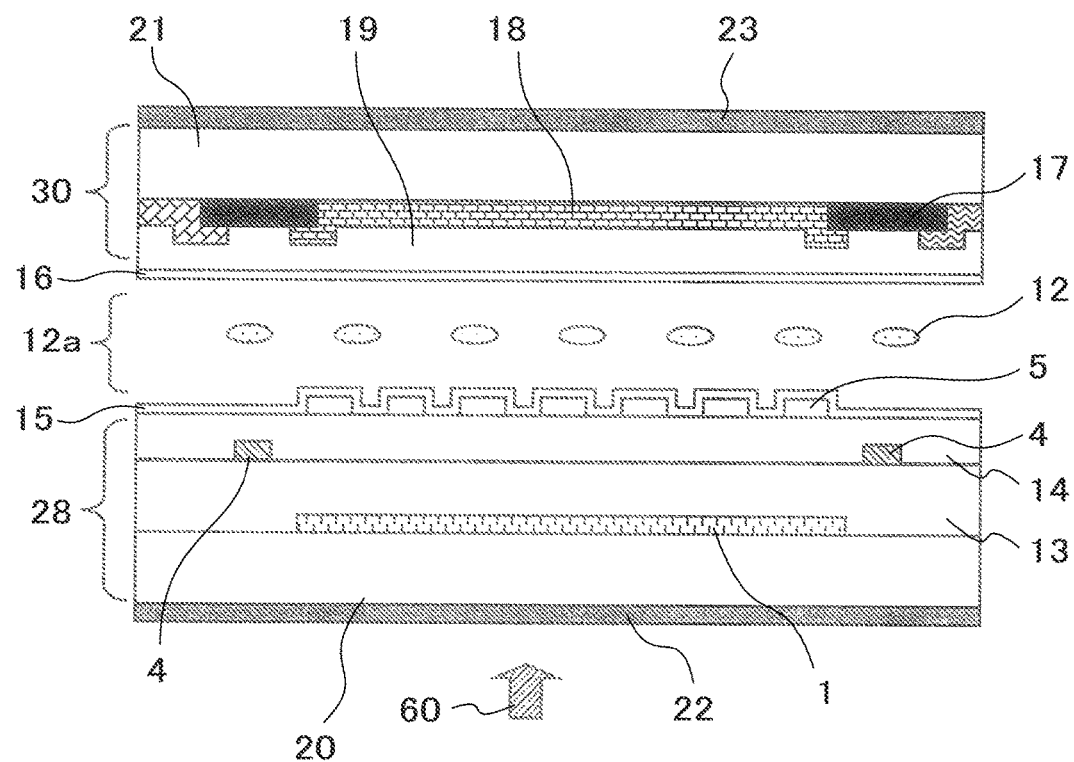
FIG. 2 is a longitudinal sectional view taken along line A-A' of FIG. 1.
Figure 3:
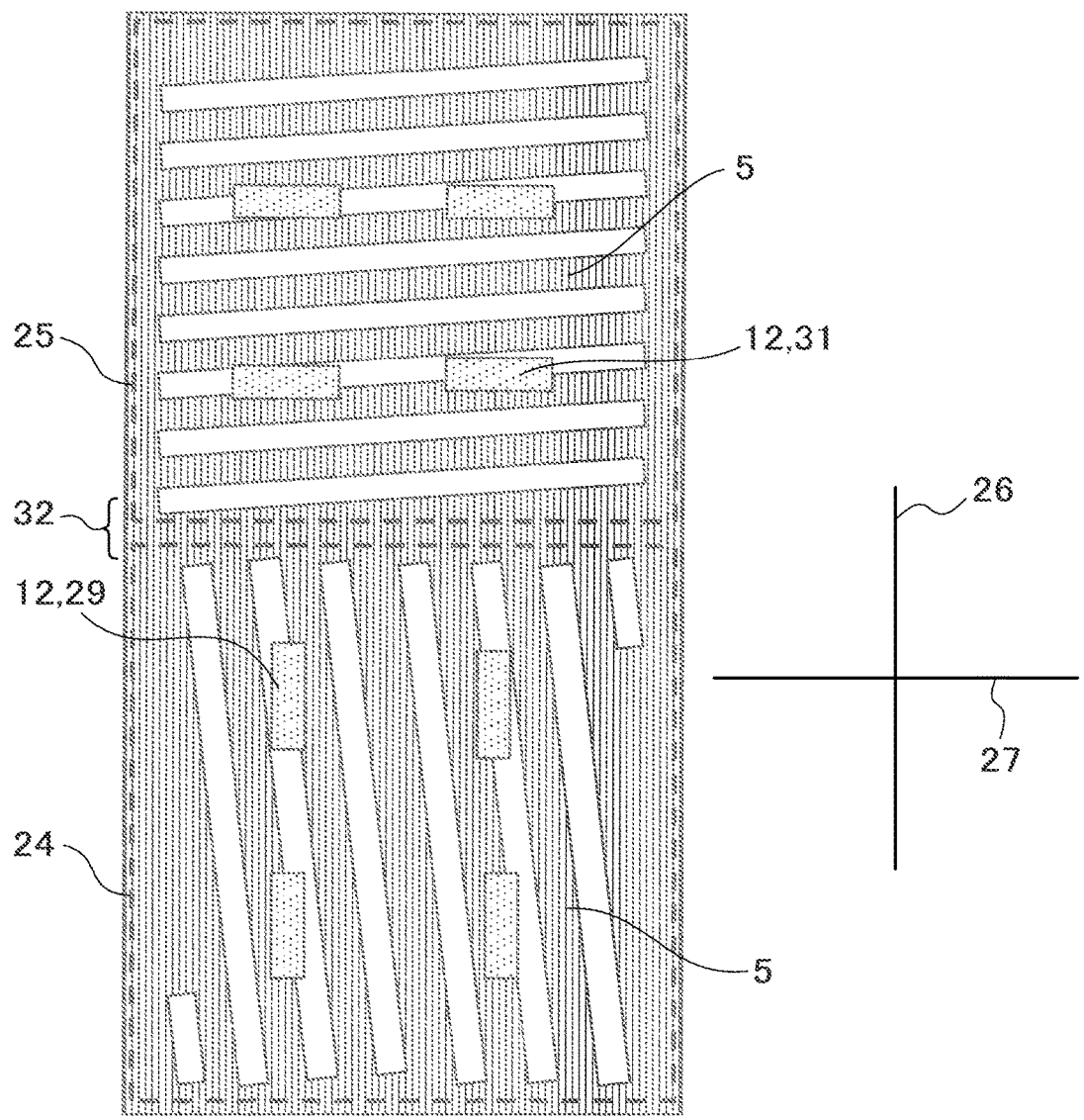
FIG. 3 is a plan view showing an alignment state of one pixel in the liquid crystal display device according to the first exemplary embodiment.
Figure 4:
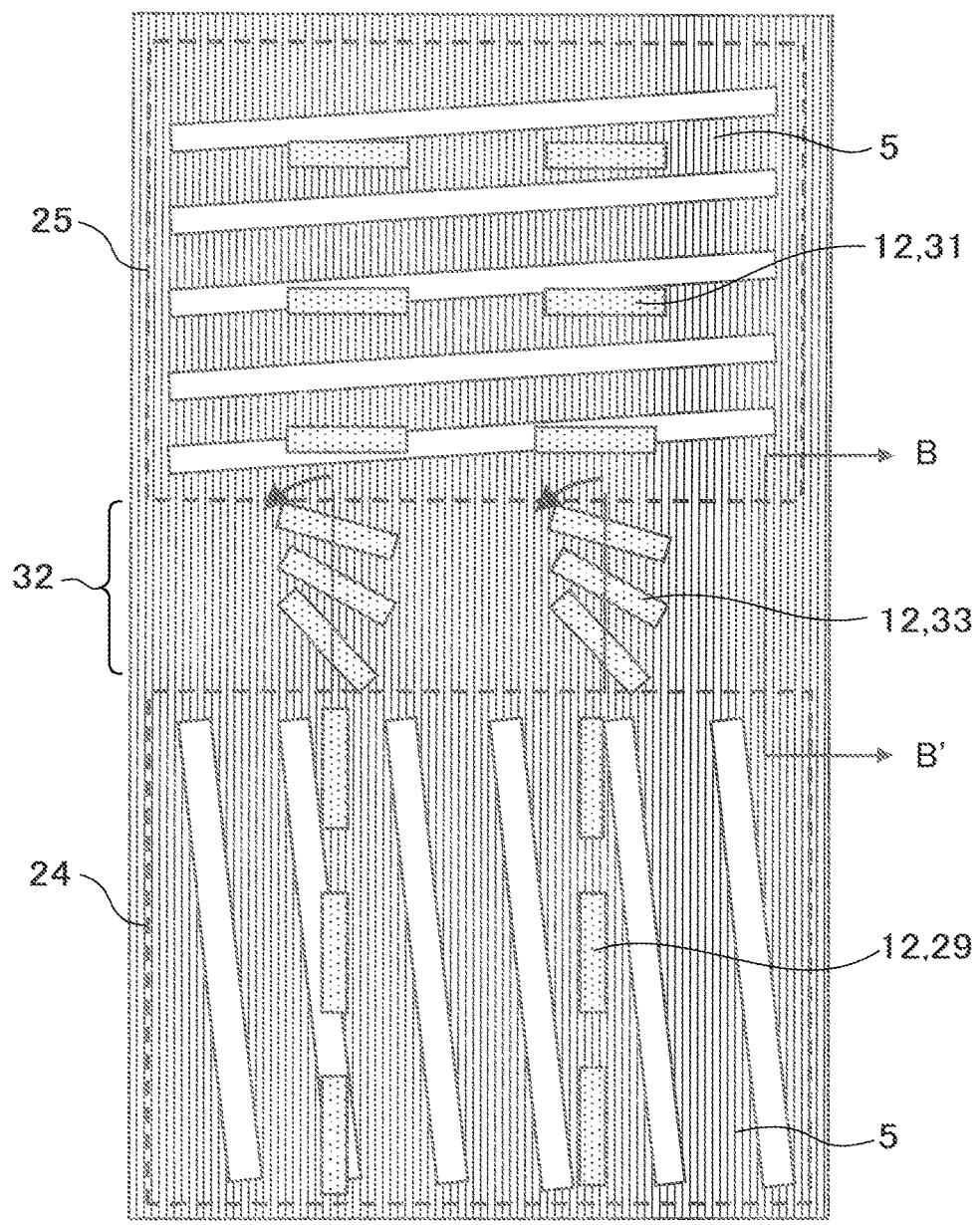
FIG. 4 is an enlarged plan view showing the alignment state of a boundary region and the vicinity thereof regarding one pixel in the liquid crystal display device according to the first exemplary embodiment.
Figure 5A:
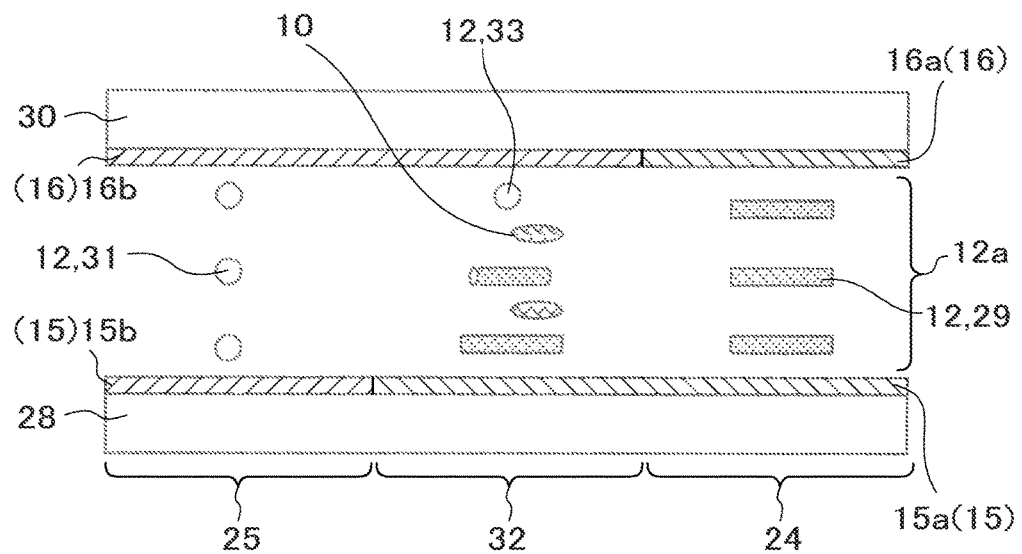
FIG. 5A is a longitudinal sectional view taken along line B-B' of FIG. 4.
Figure 5B:
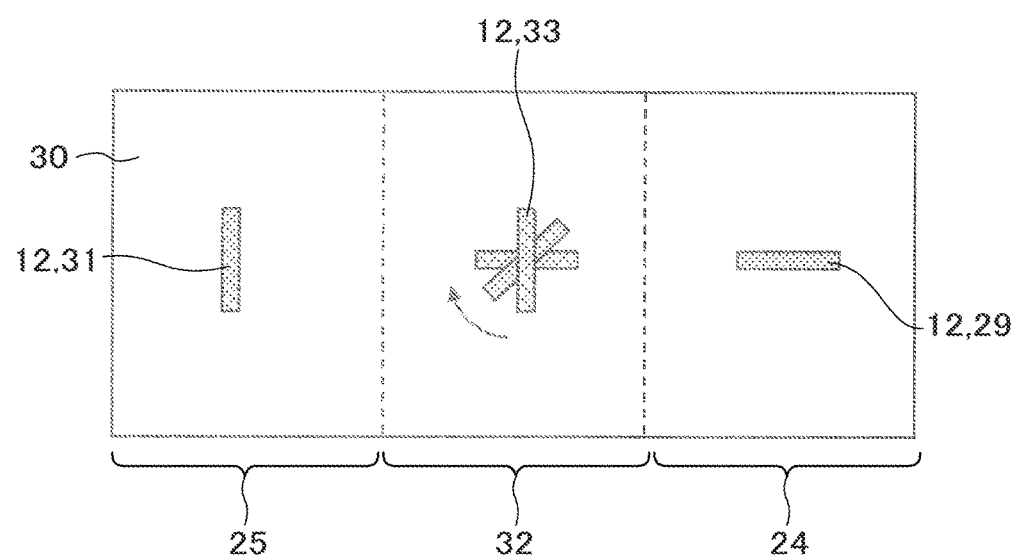
FIG. 5B is a plan view of a part corresponding to FIG. 5A when viewed from a color filter substrate side.

A first exemplary embodiment of the present invention will be described by referring to FIG. 1, FIG. 2, FIG. 3, FIG. 4, and FIG. 5. That is, reference numerals used in the explanations herein are disclosed in some of the drawings FIG. 1 to FIG. 5. FIG. 1 is a plan view of one pixel. FIG. 2 shows a sectional view taken along the line A-A' of FIG. 1. FIG. 3 shows a state where the initial alignment direction in the display region of the pixel is divided. FIG. 4 is an enlarged plan view showing the alignment state of the boundary region where the alignment is divided. FIG. 5A shows the alignment of the liquid crystal in a sectional view taken along line B-B' of FIG. 4. FIG. 5B further shows the alignment state of a case when it is viewed from a color filter substrate side.

The liquid crystal display device according to the first exemplary embodiment includes: a TFT array substrate 28 and a color filter substrate 30 as two substrates opposing to each other; a liquid crystal layer 12a which is sandwiched between the TFT array substrate 28 and the color filter substrate 30, and constituted with liquid crystal 12 aligned in a direction substantially in parallel to the TFT array substrate 28 and the color filter substrate 30; and a pixel electrode 5 as a linear electrode which generates a lateral electric field substantially in parallel to the TFT array substrate 28 and the color filter substrate 30. The liquid crystal display device controls the display by rotating the liquid crystal 12 by the lateral electric field in a plane that is substantially in parallel to the TFT array substrate 28 and the color filter substrate 30.

Each pixel (FIG. 1 to FIG. 5) constituting the display is divided into a region 24 as the region I, a region 25 as the region II, and a boundary region 32 between the region 24 and the region 25. An initial alignment direction 29 of the liquid crystal 12 in the region 24 and an initial alignment direction 31 of the liquid crystal 12 in the region 25 are orthogonal to each other. The extending direction of the pixel electrode 5 in the region 24 and the extending direction of the pixel electrode 5 in the region 25 are orthogonal to each other as well. The extending direction of the pixel electrode 5 in the region 24 comes to meet the pixel electrode in the region 25 when extended. An initial alignment direction 33 of the liquid crystal 12 in the region 32 is the direction rotated in a same rotating direction from the initial alignment direction 29 of the region 24 at an acute angle.

Hereinafter, the first exemplary embodiment will be described in details by following the fabricating procedure.

First, 50 nm of ITO (indium tin oxide) is deposited as a first transparent conductive film on a transparent insulating substrate 20 constituted with a first glass substrate, and a pattern of a plan common electrode 1 is formed on the ITO. Further, 250 nm of chrome (Cr) is deposited thereon as a first metal layer, and patterns of a scan line 3 and a common signal wiring 2 are formed on the chrome.

Subsequently, 400 nm of silicon nitride (SiNx) is deposited as a gate insulating film 13, 200 nm of amorphous silicon hydride (a-Si:H) and 50 nm of n-type amorphous silicon hydride (n-a-Si:H) are deposited in a stacked manner as a thin film semiconductor layer 6, and patterning is performed by leaving the thin film semiconductor layer 6 only in a TFT (thin film transistor) part to be a switching element of the pixel. Furthermore, 250 nm of chrome is deposited as a second metal layer, and a part of patterns of a data line 4, a source electrode 7s as well as a drain electrode 7d of the TFT, and a pixel electrode 5 constituted with the second metal layer is formed on the chrome.

Subsequently, the n-type amorphous silicon hydride (n-a-Si:H) of the thin film semiconductor layer 6 is removed by having the source electrode 7s and the drain electrode 7d of the TFT as the mask. Then, 150 nm of silicon nitride (SiNx) is deposited as a protection insulating film 14, and a through-hole 8 for connecting the pixel electrode 5 is formed in a part of the silicon nitride. Further, 40 nm of ITO is deposited thereon as a second transparent conductive film, and a pattern of the pixel electrode 5 is formed on the ITO. The pixel electrode 5 is in a form in which a striped pattern is connected at both ends 9. The width of the striped pixel electrode 5 is set as 3 μm, and the width of the slit between the electrodes in a striped form is set as 6 μm. The striped pixel electrode 5 is extended in the direction rotated counterclockwise by 8 degrees from the horizontal direction (extending direction of the scan line 3) in the region 25 as the upper half part region II of the pixel, and the striped pixel electrode 5 is extended in the direction orthogonal thereto in the region 24 as the lower half part region I of the pixel. The TFT array substrate 28 is fabricated by the method described above.

In the case where the extending direction of the striped pixel electrode 5 formed linearly in one of the regions meets the striped pixel electrode 5 formed linearly in the other region, one of the regions is referred to as the region I, i.e., the region 24, and the other region is referred to as the region II, i.e., the region 25, as the names for the regions I and II.

Further, a black matrix 17 is formed by using resin black on the transparent insulating substrate 21 constituted with the second glass substrate. A color layer 18 of RGB (red, green, and blue) is formed thereon in a prescribed pattern, and an overcoat layer 19 is formed thereon. Furthermore, a columnar spacer (not shown) is formed on the black matrix 17 at the position opposing to the scan line 3 when superimposed on the overcoat layer 19.

Alignment films 15 and 16 that can be aligned by irradiating light are formed on both of the TFT array substrate 28 and the color filter substrate 30 formed in the manner described above, and photoalignment processing is performed to form the region 24 and the region 25 shown in FIG. 4. In the region 25 where the striped pixel electrode 5 is extended in the direction rotated counterclockwise by 8 degrees from the horizontal direction (the extending direction of the scan line 3 shown in FIG. 1) in the upper half part of FIG. 4, the initial alignment direction 31 is set in the horizontal direction. At this time, the pretilt angle is set as 0 degree in both of the TFT array substrate 28 and the color filter substrate 30. Further, in the region 24 where the striped pixel electrode 5 is extended in the direction rotated counterclockwise by 8 degrees from the longitudinal direction (the direction orthogonal to the extending direction of the scan line 3 shown in FIG. 1) in the lower half part of FIG. 4, the initial alignment direction 29 is set in the longitudinal direction. At this time, the pretilt angle is set as 0 degree in both of the TFT array substrate 28 and the color filter substrate 30.

As shown in FIG. 5A and FIG. 5B, when performing photoalignment on both of the TFT array substrate 28 and the color filter substrate 30, the alignment processing directions of each of the alignment films 15 and 16 are determined. In the TFT array substrate 28, the alignment film 15 in the regions 24 and 25 is formed as alignment films 15a and 15b whose alignment processing directions are orthogonal to each other. In the color filter substrate 30, the alignment film 16 in the regions 24 and 25 is formed as alignment films 16a and 16b whose alignment processing directions are orthogonal to each other. Further, the alignment film 15 in the boundary region 32 is set as the same as the alignment film 15a in the region 24 in the TFT array substrate 28, while the alignment film 16 in the boundary region 32 is set as same as the alignment film 16b in the region 25 in the color filter substrate 30. That is, the alignment processing directions of the alignment films 15a and 16b in the boundary region 32 are orthogonal to each other. In other words, in the boundary region 32, the alignment direction same as that of the region 24 is expanded in the TFT array substrate 28, while the alignment direction same as that of the region 25 is expanded in the color filter substrate 30. In the boundary region 32, the width of the region where the alignment films 15a and 16b are set to be in the state of the alignment films of the both substrates is set as 2 to 5 μm.

As described above, in the boundary region 32 according to the first exemplary embodiment, the alignment processing directions in the two interfaces (the alignment films 15a, 16b) between the liquid crystal layer 12a and the TFT array substrate 28 as well as the color filter substrate 30 are orthogonal to each other between one interface (the alignment film 15a) and the other interface (the alignment film 16b). The alignment processing direction of one interface (the alignment film 15a) is the same as the alignment processing direction of the region 24, and the alignment processing direction of the other interface (the alignment film 16b) is the same as the alignment processing direction of the region 25.

Further, a seal material is applied to the TFT array substrate 28 and the color filter substrate 30 to laminate those to each other, and the liquid crystal 12 exhibiting positive permittivity anisotropy is inserted and sealed. Note here that the property value of the liquid crystal 12 is set as $\Delta\varepsilon=5.5$, $\Delta n=0.100$, and the height of the columnar spacer is controlled so that the thickness d of the liquid crystal layer 12a becomes 4.0 μm. At this time, retardation of the liquid crystal layer 12a is given by the product of $\Delta n$ and d, which is set as 400 nm. A clockwise chiral material 10 is added to the liquid crystal material, and the chiral pitch of the liquid crystal material is set as 80 μm.

Further, polarization plates 22, 23 are laminated on the outside of the substrates 20, 21 in such a manner that the polarization axes thereof become orthogonal to each other. Note here that the direction of the absorption axis 26 of the polarization plate 22 on the TFT array substrate 28 side is set as same as the initial alignment direction 29 of the region 24. The direction of the absorption axis 27 of the polarization plate 23 on the color filter substrate 30 side is set as same as the initial alignment direction 31 of the region 25.

Through loading a backlight and a driving circuit to the liquid crystal display panel fabricated in the manner described above, the active-matrix type liquid crystal display device of the first exemplary embodiment can be completed. FIG. 2 shows an incident direction 60 of the backlight.

As described above, through adding the clockwise chiral material 10 into the liquid crystal material and sandwiching the liquid crystal layer 12a of the boundary region 32 by the alignment films 15a and 16b whose alignment processing directions are different from each other by 90 degrees, the liquid crystal 12 in the boundary region 32 can be twisted clockwise as shown in FIG. 5B. Thus, the initial alignment direction 33 in the boundary region 32 can be determined uniquely. In the above-described case, the liquid crystal 12 aligned in the twisted manner in the boundary region 32 is aligned in the direction rotated counterclockwise from the initial alignment direction 29 of the region 24 at an acute angle in any positions. As a result, the initial alignment direction 33 in the boundary region 32 between the region 24 and the region 25 becomes stable, so that it is possible to prevent generation of the clockwise alignment and the counterclockwise alignment in the boundary region 32 simultaneously which may cause unstable alignment. Therefore, a uniform display can be acquired.

When the chiral material 10 is added as described above, it is desirable for the chiral pitch of the liquid crystal material to be four times or more of the cell gap of the liquid crystal layer 12a and to be 200 μm or less. When the chiral pitch is too short with respect to the thickness of the liquid crystal layer 12a, it is likely to have the azimuth of the liquid crystal director twisted at 180 degrees in the regions 24 and 25 where the alignment processing is done in the same direction on the TFT array substrate 28 side and the color filter substrate 30 side. Such fault occurs prominently in the part where the chiral pitch is twice or less of the liquid crystal layer 12a, so that it can be suppressed stably by setting the chiral pitch to be four times or more of the liquid crystal layer 12a.

In the meantime, when the chiral pitch is too long, the energy for rotating the boundary region 32 in one direction by the chiral material 10 becomes insufficient. Thus, it becomes hard to fix the initial alignment direction 33 of the boundary region 32 in one direction. Therefore, it is desirable for the chiral pitch to be 200 μm or less.

In the first exemplary embodiment, the clockwise chiral material 10 is added and the alignment directions of the alignment films 15a and 16b sandwiching the boundary region 32 are set to be different from each other by 90 degrees to stabilize the initial alignment direction 33 of the boundary region 32 in the direction rotated counterclockwise from the initial alignment direction 29 of the region 24 at an acute angle. Note here that it is possible with the structure shown in FIG. 5A and FIG. 5B to stabilize the initial alignment direction 33 of the boundary region 32 in the direction rotated clockwise from the initial alignment direction 29 of the region 24 at an acute angle through adding a counterclockwise chiral material instead of the clockwise chiral material 10.

Figure 7:
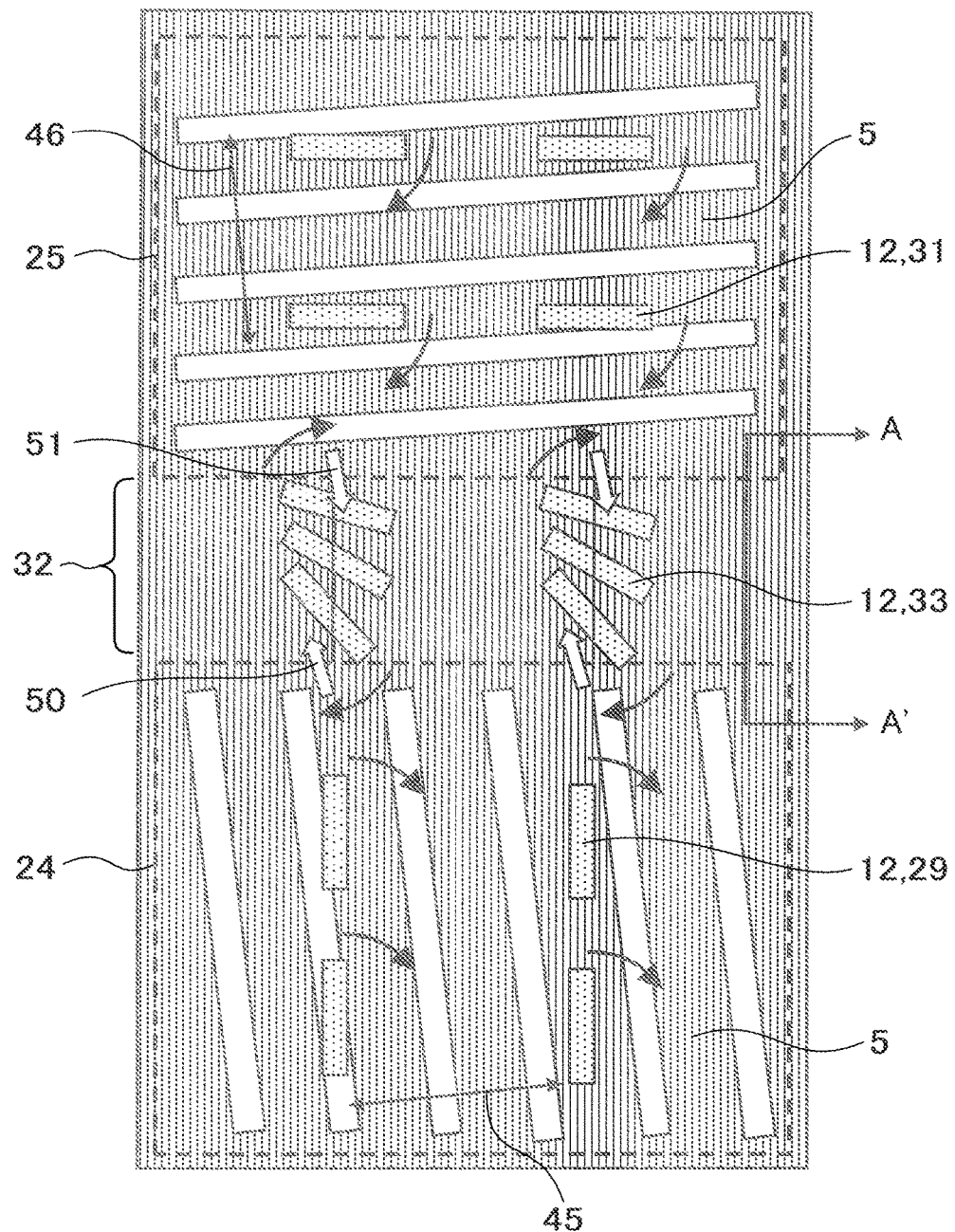
FIG. 7 is a plan view showing a case where the liquid crystal in the boundary region is rotated in a preferable direction when a lateral electric field is applied in the liquid crystal display device according to the first exemplary embodiment.
Figure 8:
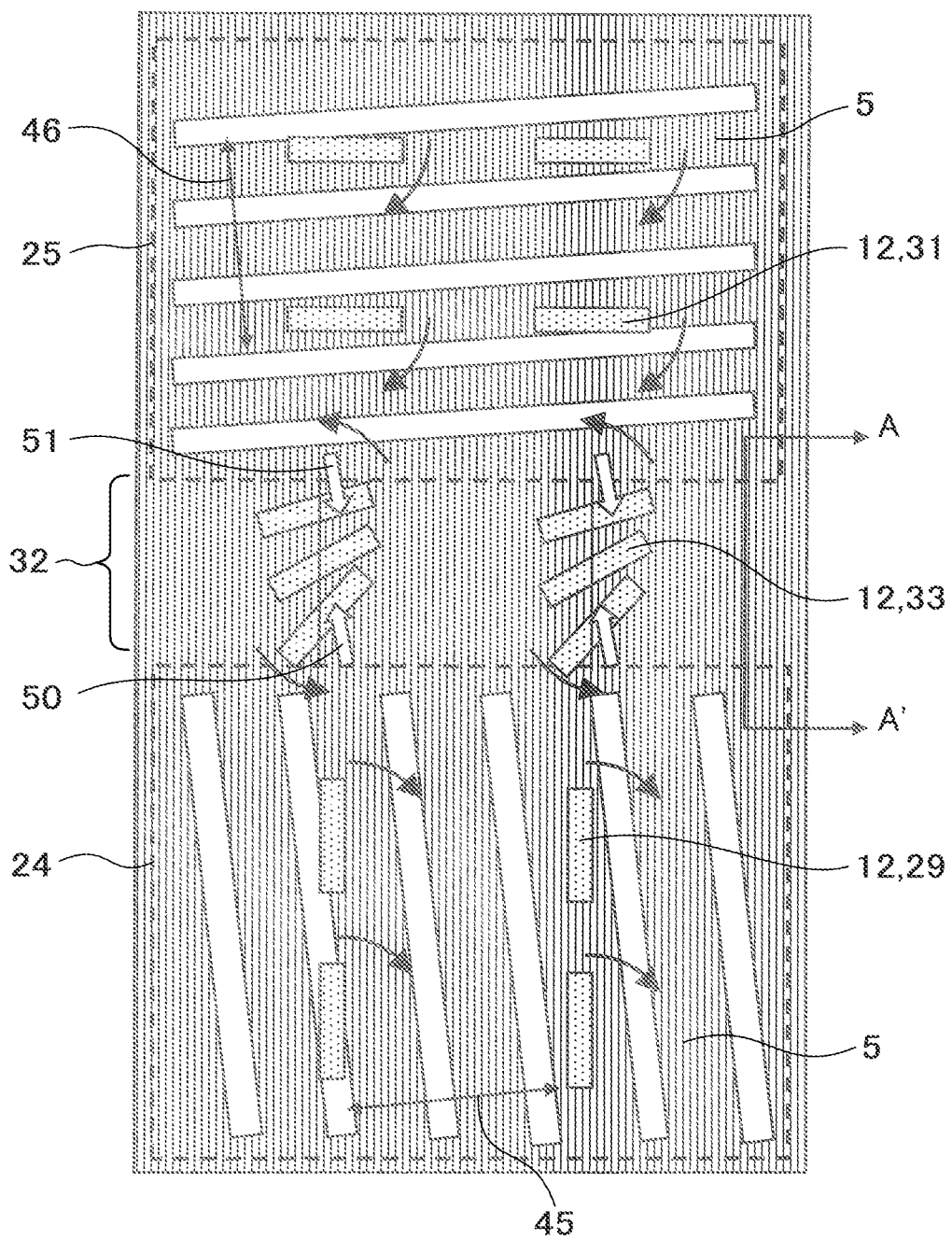
FIG. 8 is a plan view showing a case where the liquid crystal in the boundary region is rotated in an unpreferable direction when a lateral electric field is applied in the liquid crystal display device according to the first exemplary embodiment.

FIG. 7 shows a case where the alignment of the boundary region when the lateral electric field is applied to the liquid crystal is stabilized in a counterclockwise azimuth from the alignment direction of the region I as in the case of the first exemplary embodiment. FIG. 8 shows a case where the alignment of the boundary region is stabilized in a clockwise azimuth from the alignment direction of the region I by making the chirality of the chiral material as opposite. In the first exemplary embodiment, the extending direction of the pixel electrode 5 is set in the direction rotated counterclockwise by 8 degrees from the initial alignment directions 29 and 31 of the regions 24 and 25, respectively. Thus, when lateral electric fields 45 and 46 in the direction orthogonal to the pixel electrode 5 are applied, the liquid crystal 12 is rotated clockwise in each of the regions 24 and 25 as shown in FIG. 7.

In the meantime, an electric field 51 in the azimuth orthogonal to the longitudinal direction of the pixel electrode in the region 25 is the main in the boundary between the boundary region 32 and the region 25, while an electric field 50 in the longitudinal direction of the pixel electrode 5 in the region 24 is the main in the boundary between the boundary region 32 and the region 24. Thus, as shown in FIG. 7, in a case where the initial alignment direction 33 of the boundary region 32 is distributed in the direction rotated counterclockwise from the initial alignment direction 29 of the region 24 at an acute angle, the liquid crystal 12 in the boundary region 32 is rotated clockwise by the applied electric field.

In the meantime, as shown in FIG. 8, in a case where the initial alignment direction 33 of the boundary region 32 is distributed in the direction rotated clockwise from the initial alignment direction 29 of the region 24 at an acute angle, the liquid crystal 12 in the boundary region 32 is rotated counterclockwise by the applied electric field. As described above, the liquid crystal 12 is rotated clockwise in the regions 24 and 25 by the applied electric field. Therefore, as shown in FIG. 8, when the liquid crystal 12 is rotated counterclockwise in the boundary region 32 by the applied electric field, only this part is rotated in the reversed direction. Thus, the alignment becomes unstable. This may result in causing issues such as having a domain abnormality that is generated when the display surface of the liquid crystal display device is pressed by a finger, for example.

Therefore, with the structure shown in FIG. 7, the liquid crystal 12 in all the regions 24, 25 and the boundary region 32 is rotated clockwise so that the alignment of the liquid crystal 12 becomes stabile. Thus, it is possible to acquire a fine display with less generation of the domain abnormality even when the display surface is pressed by a finger.

In order to set the rotating direction of the liquid crystal 12 in the regions 24, 25 and the rotating direction of the liquid crystal 12 in the boundary region 32 to be the same when a potential difference is given between the pixel electrode 5 and the common electrode 1 (see FIG. 1 and FIG. 2), it is desirable to set the initial alignment direction 33 in the boundary region 32 to be in the direction rotated counterclockwise from the initial alignment direction 29 of the region 24 at an acute angle. This rotating direction is the opposite direction from the rotating direction of the liquid crystal 12 by the lateral electric fields 45, 46 in the regions 24, 25.

Further, the angles are so set that the initial alignment direction 31 of the region 25 in the upper half part of FIG. 4 and the initial alignment direction 29 of the region 24 in the lower half part become orthogonal to each other, and the area of the region 24 and the area of the region 25 are set to be almost equivalent. This makes it easier to mutually compensate the region 24 and the region 25 with each other, so that it is possible to acquire a fine viewing angle property with fine symmetry as well as less fluctuation and coloring caused by the viewing angle in the voltage-luminance property.

In the liquid crystal display device acquired in the manner described above, the liquid crystal 12 is rotated clockwise in both of the region 24 and the region 25 when an electric field is applied between the pixel electrode 5 and the common electrode 1. In the region 24 and the region 25, the initial alignment directions 29 and 31 of the liquid crystal 12 are orthogonal to each other, the lateral electric fields 45 and 46 are also orthogonal to each other, and the angles formed between the initial alignment directions 29, 31 and the lateral electric fields 45, 46 are almost equivalent. Thus, the liquid crystal 12 in the region 24 and the liquid crystal 12 in the region 25 are rotated while keeping the state of being orthogonal to each other. Therefore, shift of the voltage-transmittance property as the issue with each of the region 24 and the region 25 alone can be suppressed dramatically since the viewing angle properties compensate with each other by designing the both regions 24, 25 to have a same-sized area (see FIG. 20A and FIG. 20B).

The initial alignment direction 33 of the boundary region 32 described above faces towards the direction different from the polarization axes of the polarization plates 22 and 23 at the time of the black display, thereby generating light leakages. Thus, it is desirable to shield the light in this part. In the first exemplary embodiment, the light is shielded by disposing the common signal wiring 2 constituted with the first metal layer in this part. Thereby, only a necessary region can be light-shielded with high precision, so that a sufficient light shielding can be done without deteriorating the numerical aperture.

Further, the potential of the nontransparent metal layer is equivalent to that of the common electrode 1, so that it is possible to acquire a fine display without giving an electric disturbance. While the nontransparent metal layer with the potential equivalent to that of the common electrode 1 is disposed on the TFT array substrate 28 side to suppress the light leakage in the above-described case, the same effect can also be acquired by setting the nontransparent metal layer to have the potential equivalent to that of the pixel electrode 5. Further, it is also possible to shield the light in the boundary part 32 between the region 24 and the region 25 by providing the black matrix 17 on the color filter substrate 30 side.

When dividing the alignment by irradiation of light in the first exemplary embodiment described above, it is difficult to divide the light irradiation region completely with a line. Thus, light irradiation is performed by having an overlapped part of about 1 μm between the regions so as not to have any region in the pixel where the alignment is undone because the light is not irradiated. Thereby, there is no part within the pixel where the alignment is uncompleted. As a result, it is possible to set the alignment of the boundary region 32 depicted in the first exemplary embodiment to be in a more perfect alignment state.

While the angles between the striped pixel electrode 5 and the initial alignment directions 29, 31 of the liquid crystal 12 are set as 8 degrees in each of the regions 24 and 25 in the first exemplary embodiment described above, it is possible to acquire an almost equivalent fine display by setting the angles within the range of 5 to 10 degrees. Further, in some cases, it is possible to acquire a fair display by setting the angles between 2 degrees and 20 degrees, both inclusive. As described, the initial alignment directions 29, 31 and the extending direction of the striped pixel electrode 5 can be designed as appropriate in accordance with the shape and the size of the pixel.

As an exemplary advantage according to the invention, it is possible to acquire a lateral electric field type liquid crystal display device having two regions where the initial alignment directions of the liquid crystal state are set to be orthogonal, with which a fine display can be acquired even when viewed from oblique view fields at the time of black display.

Second Exemplary Embodiment

Figure 6A:
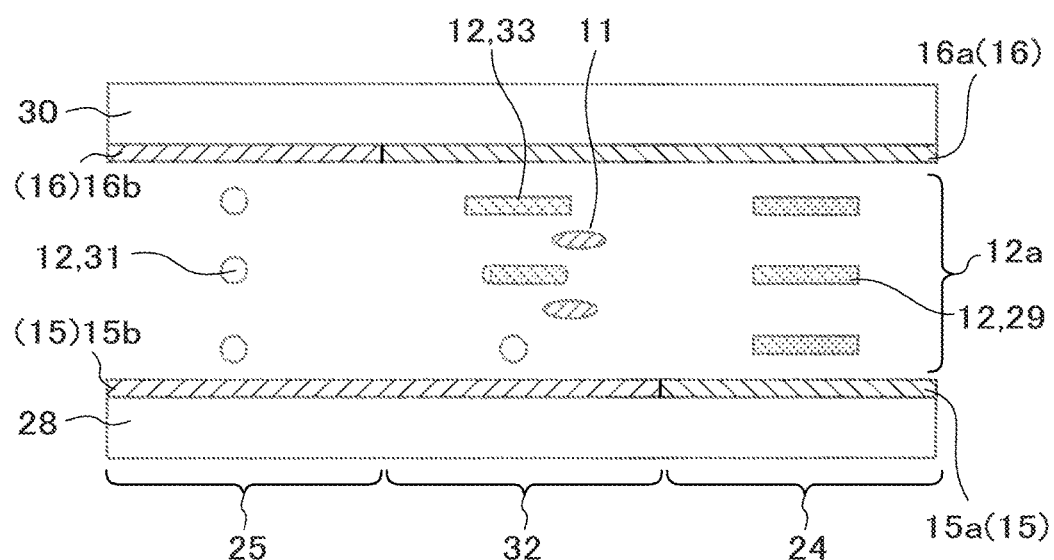
FIG. 6A is a sectional view which corresponds to FIG. 5A in a liquid crystal display device according to a second exemplary embodiment.

A second exemplary embodiment of the present invention will be described by referring to FIG. 6A and FIG. 6B. The second exemplary embodiment of the present invention has the structure same as that of the first exemplary embodiment except for the alignment state of the boundary region. FIG. 6A is a sectional view showing the alignment of the liquid crystal in the region I and the region II, and FIG. 6B further shows the alignment when it is viewed from the color filter substrate side.

As shown in FIG. 5, when determining the alignment directions by performing photoalignment in both of the TFT array substrate 28 and the color filter substrate 30 in the first exemplary embodiment, in the boundary region 32, the alignment direction of the region 24 in the TFT array substrate 28 is expanded by an alignment film 15*a* same as the region 24 while the alignment direction of the region 25 in the color filter substrate 30 is expanded by an alignment film 16*b* same as the region 25. Further, through adding the clockwise chiral material 10 to the liquid crystal material, the initial alignment direction 33 in the boundary region 32 where the alignment films 15*a* and 16*b* are opposing to each other is fixed to the direction shown in FIG. 5B.

In the meantime, when determining the alignment directions by performing photoalignment in both of the TFT array substrate 28 and the color filter substrate 30 in the second exemplary embodiment, in the boundary region 32, the alignment direction of the region 25 in the TFT array substrate 28 is expanded by the alignment film 15*b* same as the region 25 while the alignment direction of the region 24 in the color filter substrate 30 is expanded by the alignment film 16*a* same as the region 24. In other words, in the boundary region 32, the alignment films 15*b* and 16*a* whose alignment processing directions are different by 90 degrees are formed.

Figure 6B:
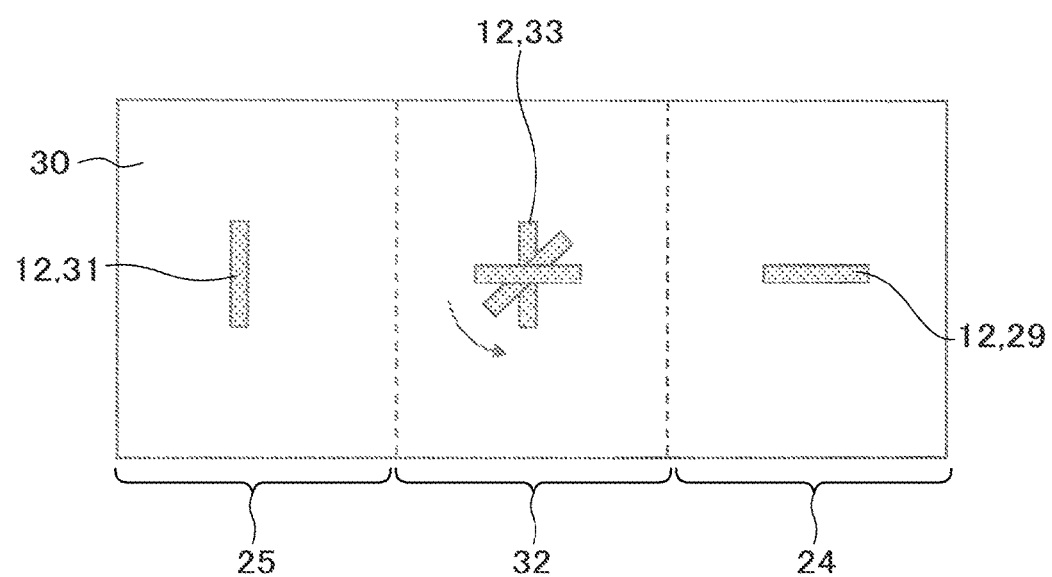
FIG. 6B is a plan view of a part corresponding to FIG. 6A when viewed from a color filter substrate side.

Further, through adding the counterclockwise chiral material 11 to the liquid crystal material, the initial alignment direction 33 in the boundary region 32 where the alignment films 15*b* and 16*a* are opposing to each other is fixed to the direction shown in FIG. 6B. That is, the initial alignment direction 33 in the boundary region 32 can be connected to the initial alignment direction 31 of the region 25 while being rotated counterclockwise from the initial alignment direction 29 of the region 24. In this case, the chiral pitch of the liquid crystal material is also set as 80 μm.

Since the initial alignment direction 33 in the boundary region 32 can thereby be determined uniquely, the alignment of the liquid crystal 12 is stabilized. This makes it possible to acquire a fine display. Further, as in the case shown in FIG. 7, when an electric field is applied between the striped pixel electrode 5 and the plan common electrode 1 (see FIG. 1 and FIG. 2) in the second exemplary embodiment, the liquid crystal 12 in the boundary region 32 is rotated clockwise by the electric field working between the region 24 and the boundary region 32 and between the region 25 and the boundary region 32. Thus, the rotating direction of the liquid crystal 12 in the boundary region 32 becomes the same as the rotating directions of the liquid crystal 12 in each of the regions 24 and 25. Therefore, even when the liquid crystal 12 is rotated by applying an electric field, the alignment in the region 24, the boundary region 32, and the regions 25 becomes stable. Further, there is little chance of generating a domain abnormality even in a case where the display surface is pressed by a finger, for example, so that a fine display can be acquired.

Third Exemplary Embodiment

Figure 9A:
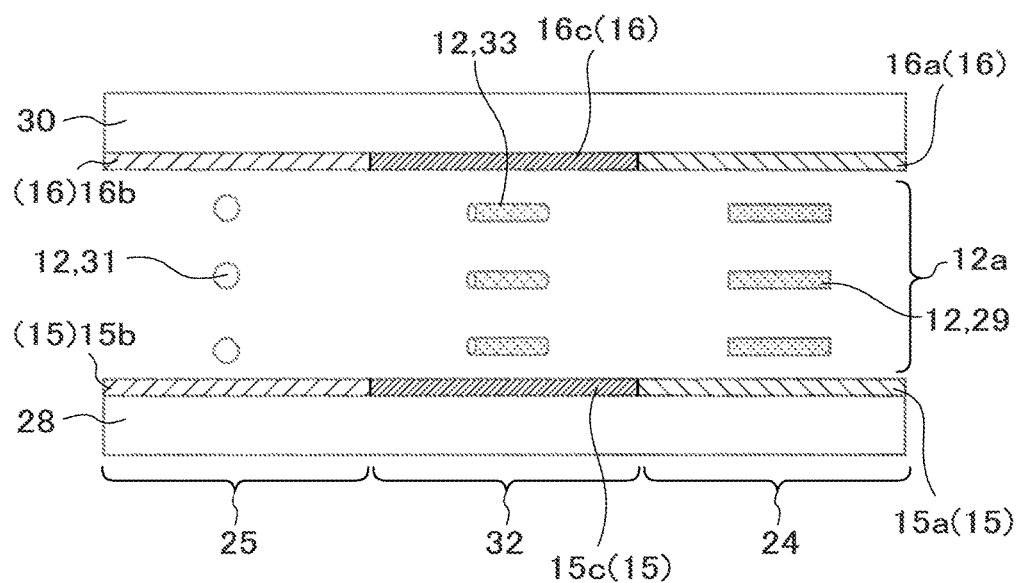
FIG. 9A is a sectional view which corresponds to FIG. 5A in a liquid crystal display device according to a third exemplary embodiment.
Figure 9B:
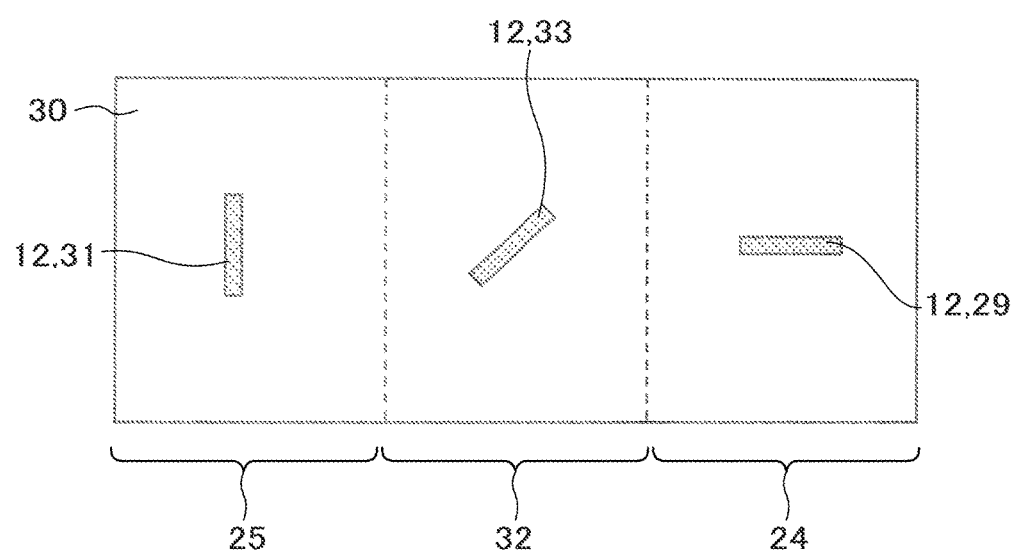
FIG. 9B is a plan view of a part corresponding to FIG. 9A when viewed from a color filter substrate side.

A third exemplary embodiment of the present invention will be described by referring to FIG. 9A and FIG. 9B. The third exemplary embodiment of the present invention has the structure same as that of the first exemplary embodiment except for the alignment state of the boundary region. FIG. 9A is a sectional view showing the alignment of the liquid crystal in the region I and the region II, and FIG. 9B further shows the alignment when it is viewed from the color filter substrate side.

When determining the alignment directions by performing photoalignment in both of the TFT array substrate 28 and the color filter substrate 30 in the third exemplary embodiment, in the boundary region 32, the initial alignment direction 33 is set in the direction rotated counterclockwise from the initial alignment direction 29 of the region 24 at a specific acute angle in both of the TFT array substrate 28 and the color filter substrate 30. That is, the alignment processing directions of the alignment films 15*c*, 16*c* of the boundary region 32 are set to be oblique with respect to the alignment processing directions of the alignment films 15*a*, 16*a* of the region 24 and the alignment processing directions of the alignment films 15*b*, 16*b* of the region 25.

As described above, in the third exemplary embodiment, the alignment processing directions in the two interfaces (the alignment films 15*c*, 16*c*) between the liquid crystal layer 12*a* and the TFT array substrate 28 as well as the color filter substrate 30 in the boundary region 32 are set to be between the alignment processing direction of the region 24 and the alignment processing direction of the region 25 and are also set to be substantially the same directions.

In this case, it is not necessary to add the chiral material to the liquid crystal material. In the boundary region 32, the molecules of the liquid crystal 12 are arranged in a prescribed azimuth. Thereby, the initial alignment direction 33 in the boundary region 32 can be determined uniquely, so that the alignment of the liquid crystal 12 is stabilized. This makes it possible to acquire a fine display.

Further, as in the case shown in FIG. 7, when an electric field is applied between the striped pixel electrode 5 and the plan common electrode 1 (see FIG. 1 and FIG. 2), the rotating direction of the liquid crystal 12 in the boundary region 32 becomes clockwise by the electric fields 50, 51 working between the region 24 and the boundary region 32 and between the region 25 and the boundary region 32. Thus, the rotating direction of the liquid crystal 12 in the boundary region 32 becomes the same as the rotating directions of the liquid crystal 12 in each of the regions 24 and 25. Therefore, even when the liquid crystal 12 is rotated by applying an electric field, the alignment in the region 24, the boundary region 32, and the regions 25 becomes stable. Further, there is little chance of generating a domain abnormality even in a case where the display surface is pressed by a finger, for example, so that a fine display can be acquired.

Furthermore, in the third exemplary embodiment, the initial alignment direction 33 in the boundary region 32 is almost the same on the TFT array substrate 28 side and the color filter substrate 30 side. In this case, as a whole, the initial alignment direction 33 in the boundary region 32 comes to be in a direction rotated counterclockwise from the initial alignment direction 29 of the region 24 at an acute angle. Therefore, the same effect as those of the other exemplary embodiments can be acquired.

Fourth Exemplary Embodiment

Figure 10:
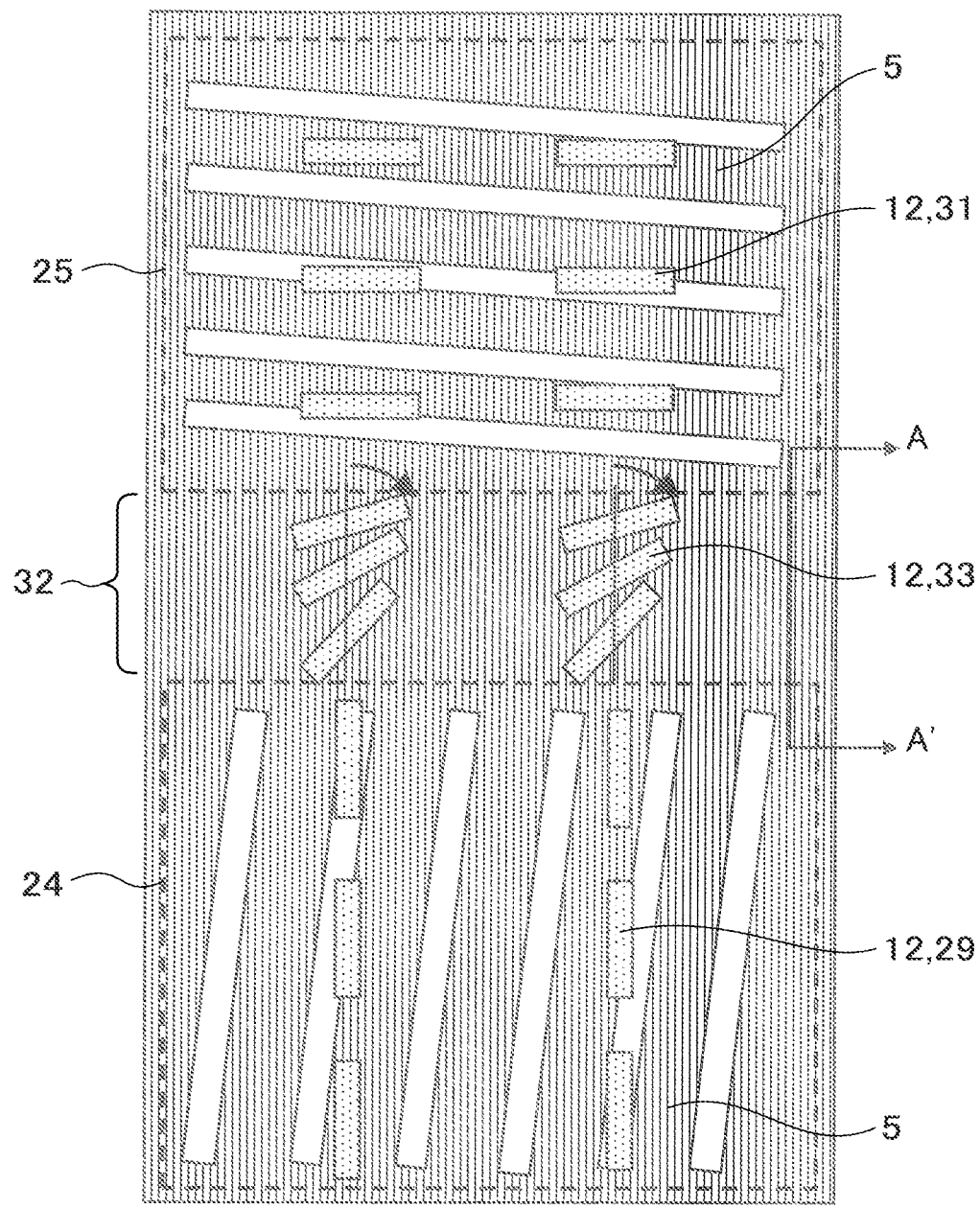
FIG. 10 is an enlarged plan view showing the alignment state of a boundary region and the vicinity thereof regarding one pixel in the liquid crystal display device according to a fourth exemplary embodiment.
Figure 11A:
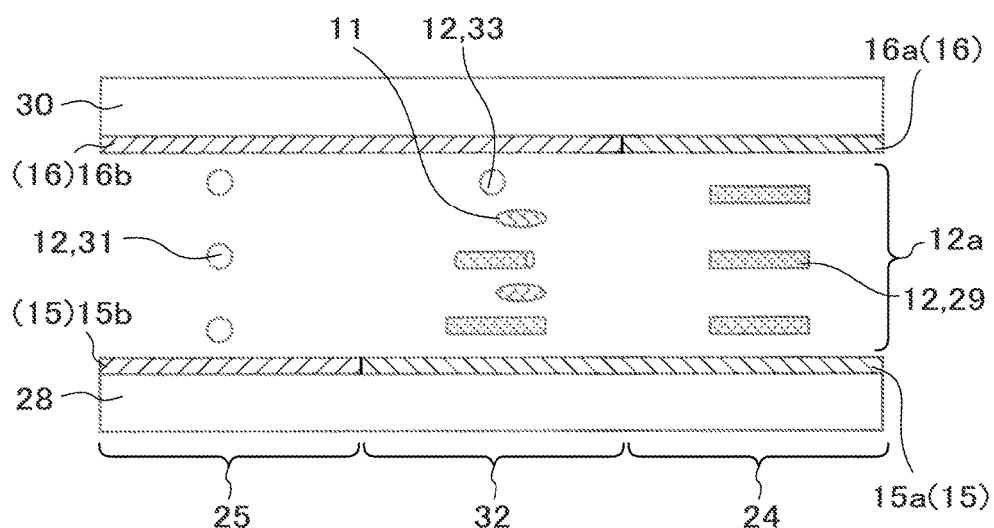
FIG. 11A is a longitudinal sectional view taken along line A-A' of FIG. 10.
Figure 11B:
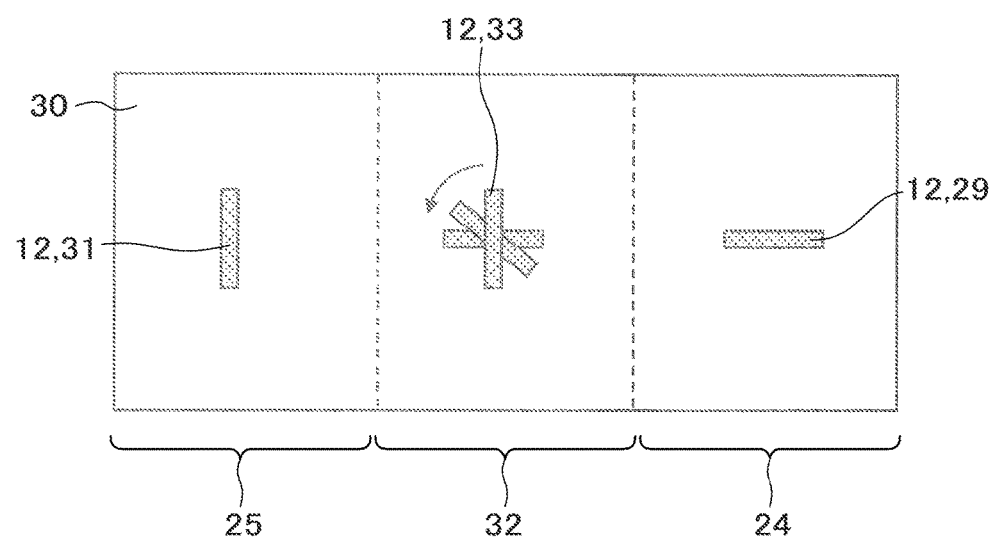
FIG. 11B is a plan view of a part corresponding to FIG. 11A when viewed from a color filter substrate side.

A fourth exemplary embodiment of the present invention will be described by referring to FIG. 10, FIG. 11A, and FIG. 11B. FIG. 10 is an enlarged plan view showing the divided-alignment state of the region I, the region II, and the boundary region. FIG. 11A shows the alignment of the liquid crystal in a sectional view taken along line A-A' of FIG. 10, and FIG. 11B further shows the alignment when it is viewed from the color filter substrate side.

In the first exemplary embodiment, the extending directions of the striped pixel electrodes 5 in the regions 24, 25 are directions rotated counterclockwise from the initial alignment directions 29, 31 of the liquid crystal 12 by 8 degrees, respectively. In the meantime, in the fourth exemplary embodiment, the extending directions of the striped pixel electrodes 5 in the regions 24, 25 are directions rotated clockwise from the initial alignment directions 29, 31 of the liquid crystal 12 by 8 degrees, respectively.

Accordingly, when an electric field is applied in the regions 24, 25, the liquid crystal 12 is rotated counterclockwise. Thus, it is desirable for the liquid crystal 12 in the boundary region 32 to be rotated counterclockwise by the electric field from the regions 24, 25. For that, as shown in FIG. 10, it is desirable to set the initial alignment direction 33 of the boundary region 32 to the direction rotated clockwise from the initial alignment direction 29 of the region 24 at an acute angle.

In order to achieve it, as shown in a sectional view of FIG. 11A, when determining the alignment directions by performing photoalignment in both of the TFT array substrate 28 and the color filter substrate 30, in the boundary region 32, the alignment direction of the region 24 in the TFT array substrate 28 is expanded by the alignment film 15a same as the region 24 while the alignment direction of the region 25 in the color filter substrate 30 is expanded by the alignment film 16b same as the region 25. In other words, in the boundary region 32, the alignment films 15a and 16b whose alignment processing directions are different by 90 degrees are formed. Further, through adding the counterclockwise chiral material 11 to the liquid crystal material, the initial alignment direction 33 in the boundary region 32 where the alignment films 15a and 16b are opposing to each other is fixed to the direction shown in FIG. 11B. In this case, the chiral pitch of the liquid crystal material is also set as 80 μm.

Since the initial alignment direction 33 in the boundary region 32 can thereby be determined uniquely, the alignment of the liquid crystal 12 is stabilized. This makes it possible to acquire a fine display. Further, when an electric field is applied between the striped pixel electrode 5 and the plan common electrode 1 (see FIG. 1 and FIG. 2), the liquid crystal 12 in the boundary region 32 is rotated counterclockwise by the electric field working between the region 24 and the boundary region 32 and between the region 25 and the boundary region 32. Thus, the rotating direction of the liquid crystal 12 in the boundary region 32 becomes the same as the rotating directions of the liquid crystal 12 in each of the regions 24 and 25. Therefore, even when the liquid crystal 12 is rotated by applying an electric field, the alignment in the region 24, the boundary region 32, and the regions 25 becomes stable. Further, there is little chance of generating a domain abnormality even in a case where the display surface is pressed by a finger, for example, so that a fine display can be acquired.

Fifth Exemplary Embodiment

Figure 12:
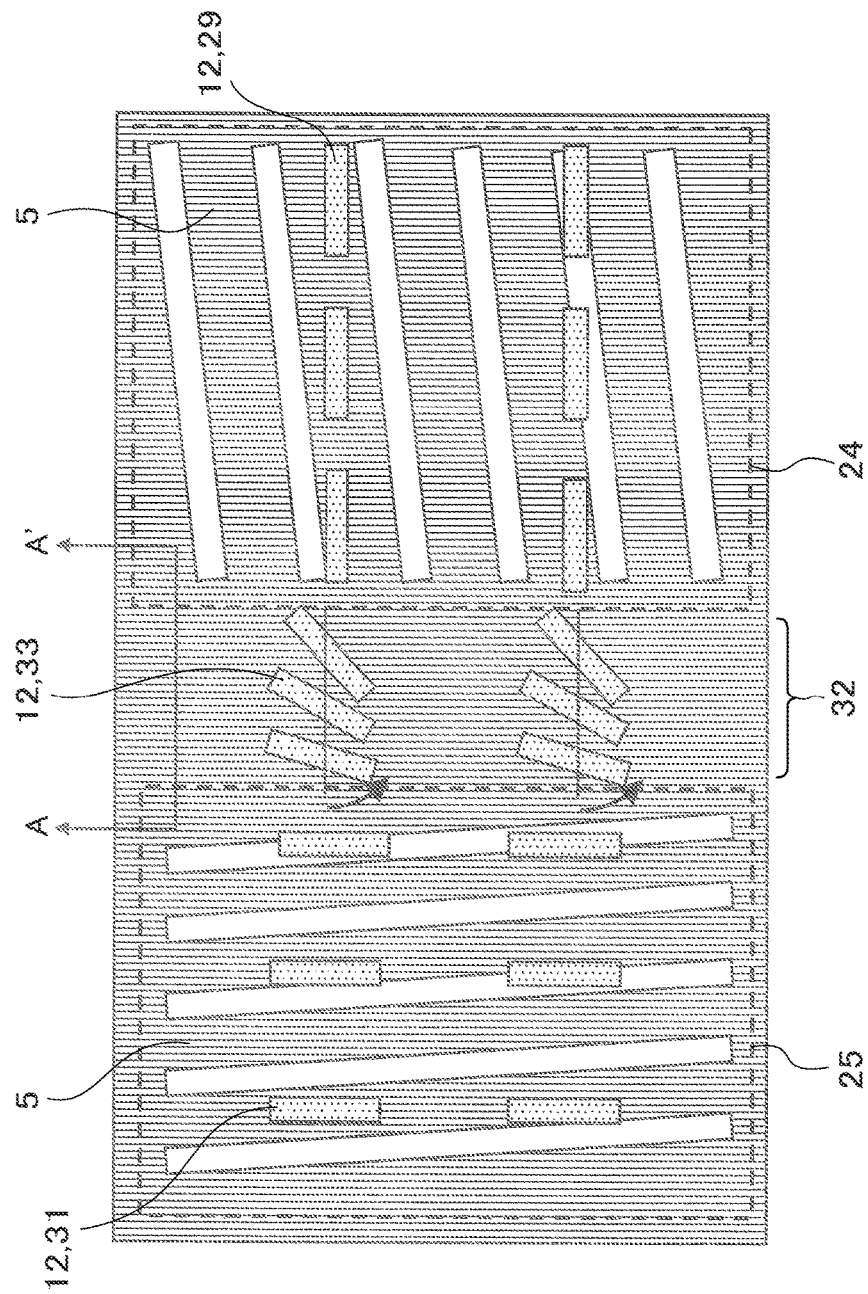
FIG. 12 is an enlarged plan view showing the alignment state of a boundary region and the vicinity thereof regarding one pixel in the liquid crystal display device according to a fifth exemplary embodiment.
Figure 13A:
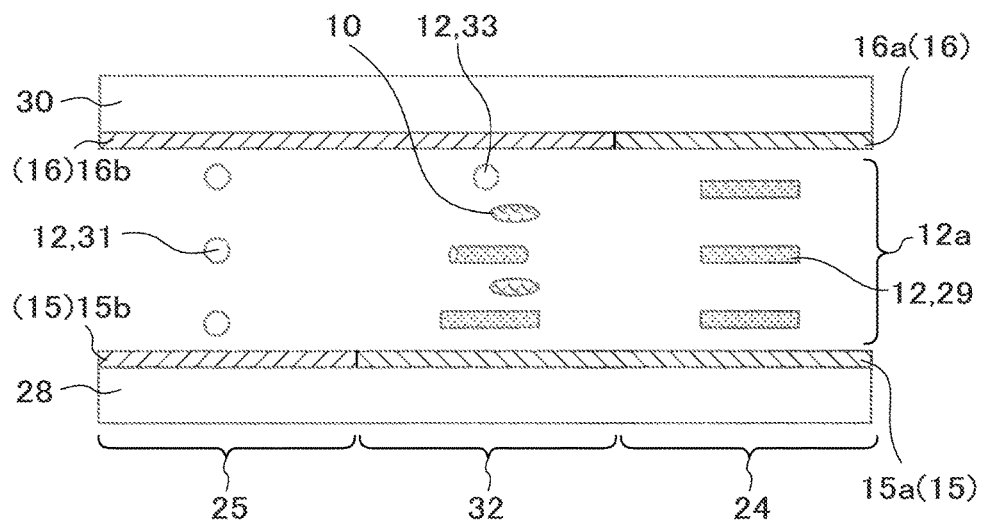
FIG. 13A is a longitudinal sectional view taken along line A-A' of FIG. 12.
Figure 13B:
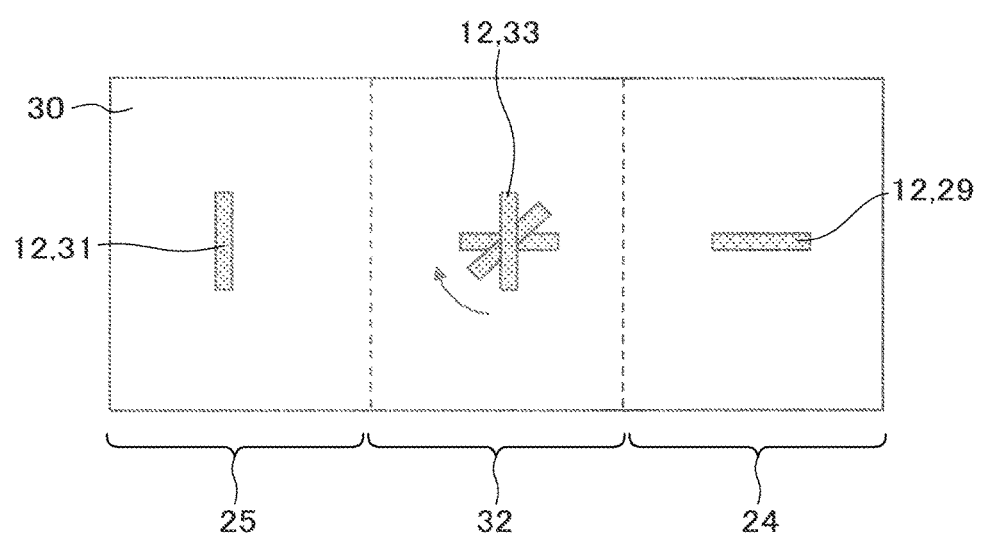
FIG. 13B is a plan view of a part corresponding to FIG. 13A when viewed from a color filter substrate side.

A fifth exemplary embodiment of the present invention will be described by referring to FIG. 12, FIG. 13A, and FIG. 13B. FIG. 12 is an enlarged plan view showing the divided-alignment state of the region I, the region II, and the boundary region. FIG. 13A shows the alignment of the liquid crystal in a sectional view taken along line A-A' of FIG. 13, and FIG. 13B further shows the alignment when it is viewed from the color filter substrate side.

The difference between the fifth exemplary embodiment and the first exemplary embodiment is that the region is divided in the lateral direction. In the case, the extending directions of the striped pixel electrodes 5 in the regions 24, 25 are also set in the directions rotated counterclockwise from the initial alignment directions 29, 31 of the liquid crystal 12 by 8 degrees, respectively. Thereby, the liquid crystal 12 in the regions 24, 25 is rotated clockwise when an electric field is applied. At this time, it is desirable to set the initial alignment direction 33 of the boundary region 32 to the direction rotated counterclockwise from the initial alignment direction 29 of the region 24 at an acute angle as shown in FIG. 12.

In order to achieve it, as shown in a sectional view of FIG. 13A, when determining the alignment directions by performing photoalignment in both of the TFT array substrate 28 and the color filter substrate 30, in the boundary region 32, the alignment direction of the region 24 in the TFT array substrate 28 is expanded by the alignment film 15a same as the region 24 while the alignment direction of the region 25 in the color filter substrate 30 is expanded by the alignment film 16b same as the region 25. In other words, in the boundary region 32, the alignment films 15a and 16b whose alignment processing directions are different by 90 degrees are formed. Further, through adding the clockwise chiral material 10 to the liquid crystal material, the initial alignment direction 33 in the boundary region 32 where the alignment films 15a and 16b are opposing to each other is fixed to the direction shown in FIG. 13B. In this case, the chiral pitch of the liquid crystal material is also set as 80 μm.

Since the initial alignment direction 33 in the boundary region 32 can thereby be determined uniquely, the alignment of the liquid crystal 12 is stabilized. This makes it possible to acquire a fine display. Further, when an electric field is applied between the striped pixel electrode 5 and the plan common electrode 1 (see FIG. 1 and FIG. 2), the liquid crystal 12 in the boundary region 32 is rotated counterclockwise by the electric field working between the region 24 and the boundary region 32 and between the region 25 and the boundary region 32. Thus, the rotating direction of the liquid crystal 12 in the boundary region 32 becomes the same as the rotating directions of the liquid crystal 12 in each of the regions 24 and 25. Therefore, even when the liquid crystal 12 is rotated by applying an electric field, the alignment in the region 24, the boundary region 32, and the regions 25 becomes stable. Further, there is little chance of generating a domain abnormality even in a case where the display surface is pressed by a finger, for example, so that a fine display can be acquired.

Sixth Exemplary Embodiment

Figure 14:
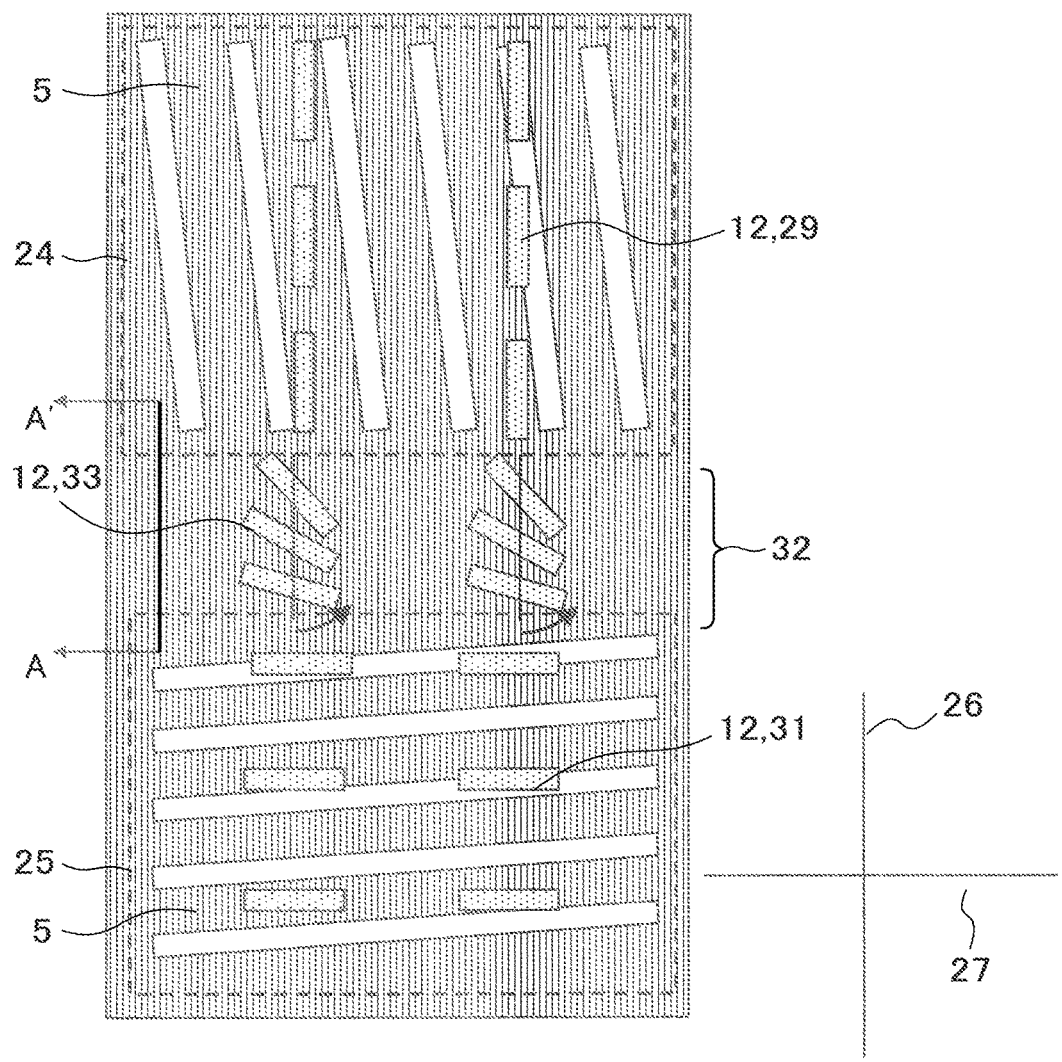
FIG. 14 is an enlarged plan view showing the alignment state of a boundary region and the vicinity thereof regarding one pixel in the liquid crystal display device according to a sixth exemplary embodiment.

A sixth exemplary embodiment of the present invention will be described by referring to FIG. 14, FIG. 15A, and FIG. 15B. FIG. 14 is an enlarged plan view showing the divided-alignment state of the region I, the region II, and the boundary region. FIG. 15A shows the alignment of the liquid crystal in a sectional view taken along line A-A' of FIG. 14, and FIG. 15B further shows the alignment when it is viewed from the color filter substrate side.

The difference between the sixth exemplary embodiment and the first exemplary embodiment is that the region 24 is the upper side of the drawing and the region 25 is the lower side of the drawing. In the case, the extending directions of the striped pixel electrodes 5 in the regions 24, are also set in the directions rotated counterclockwise from the initial alignment directions 29, 31 of the liquid crystal 12 by 8 degrees, respectively. Thereby, the liquid crystal 12 in the regions 24, 25 is rotated clockwise when an electric field is applied. At this time, it is desirable to set the initial alignment direction 33 of the boundary region 32 to the direction rotated counterclockwise from the initial alignment direction 29 of the region 24 at an acute angle as shown in FIG. 14.

In order to achieve it, as shown in a sectional view of FIG. 15A, when determining the alignment directions by performing photoalignment in both of the TFT array substrate 28 and the color filter substrate 30, in the boundary region 32, the alignment direction of the region 24 in the TFT array substrate 28 is expanded by the alignment film 15a same as the region 24 while the alignment direction of the region 25 in the color filter substrate 30 is expanded by the alignment film 16b same as the region 25. In other words, in the boundary region 32, the alignment films 15a and 16b whose alignment processing directions are different by 90 degrees are formed. Further, through adding the clockwise chiral material 10 to the liquid crystal material, the initial alignment direction 33 in the boundary region 32 where the alignment films 15a and 16b are opposing to each other is fixed to the direction shown in FIG. 15B. In this case, the chiral pitch of the liquid crystal material is also set as 80 μm.

Since the initial alignment direction 33 in the boundary region 32 can thereby be determined uniquely, the alignment of the liquid crystal 12 is stabilized. This makes it possible to acquire a fine display. Further, when an electric field is applied between the striped pixel electrode 5 and the plan common electrode 1 (see FIG. 1 and FIG. 2), the liquid crystal 12 in the boundary region 32 is rotated counterclockwise by the electric field working between the region 24 and the boundary region 32 and between the region 25 and the boundary region 32. Thus, the rotating direction of the liquid crystal 12 in the boundary region 32 becomes the same as the rotating directions of the liquid crystal 12 in each of the regions 24 and 25. Therefore, even when the liquid crystal 12 is rotated by applying an electric field, the alignment in the region 24, the boundary region 32, and the regions 25 becomes stable. Further, there is little chance of generating a domain abnormality even in a case where the display surface is pressed by a finger, for example, so that a fine display can be acquired.

Seventh Exemplary Embodiment

Figure 16:
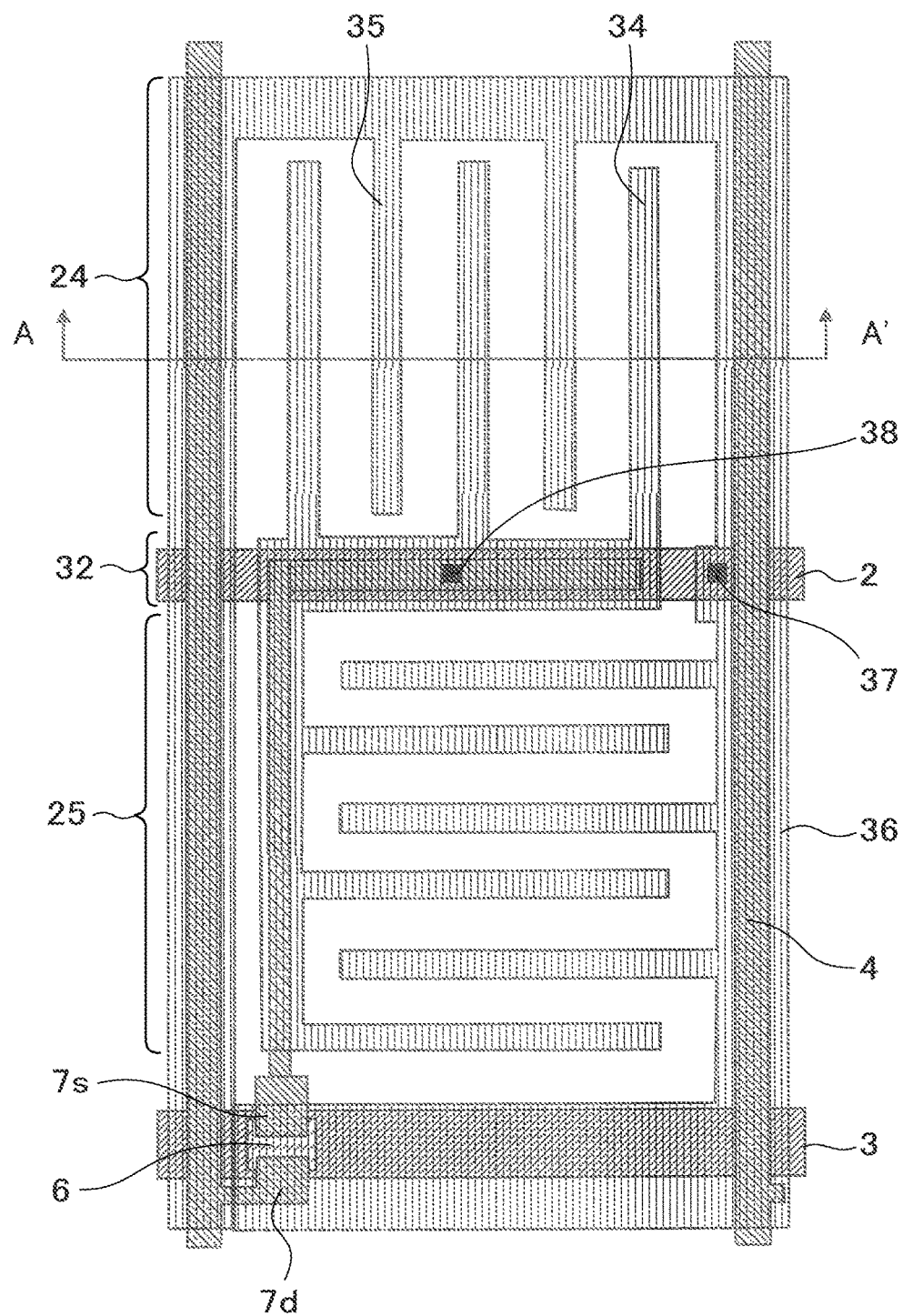
FIG. 16 is a plan view showing the structure of one pixel in a liquid crystal display device according to a seventh exemplary embodiment.
Figure 17:
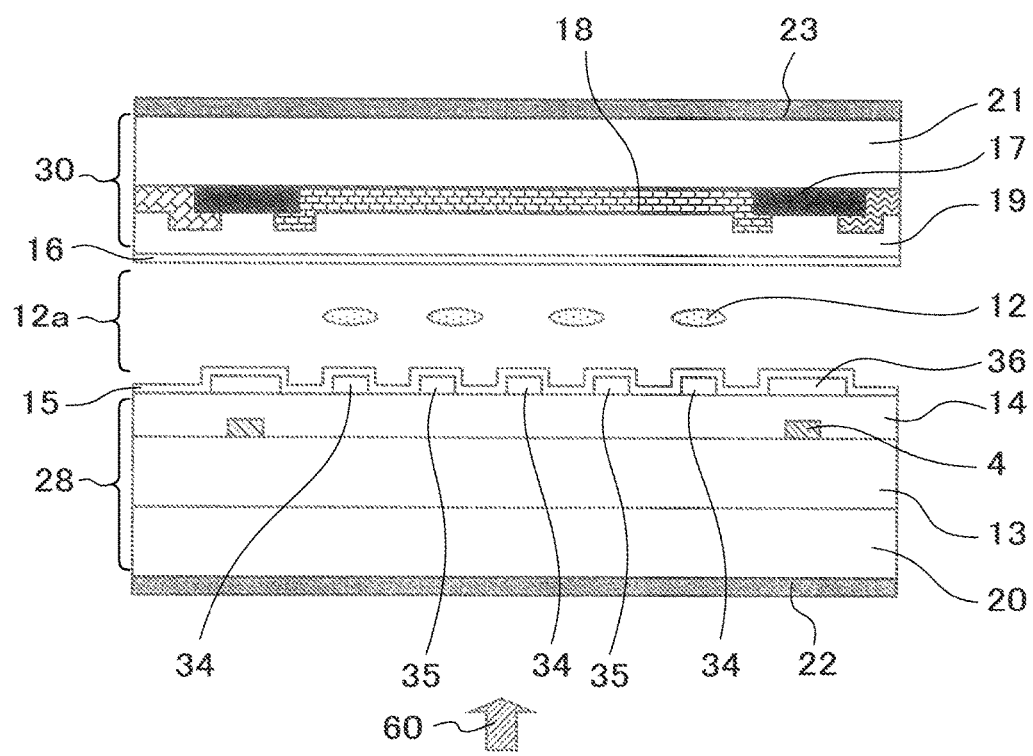
FIG. 17 is a longitudinal sectional view taken along line A-A' of FIG. 16.
Figure 18:
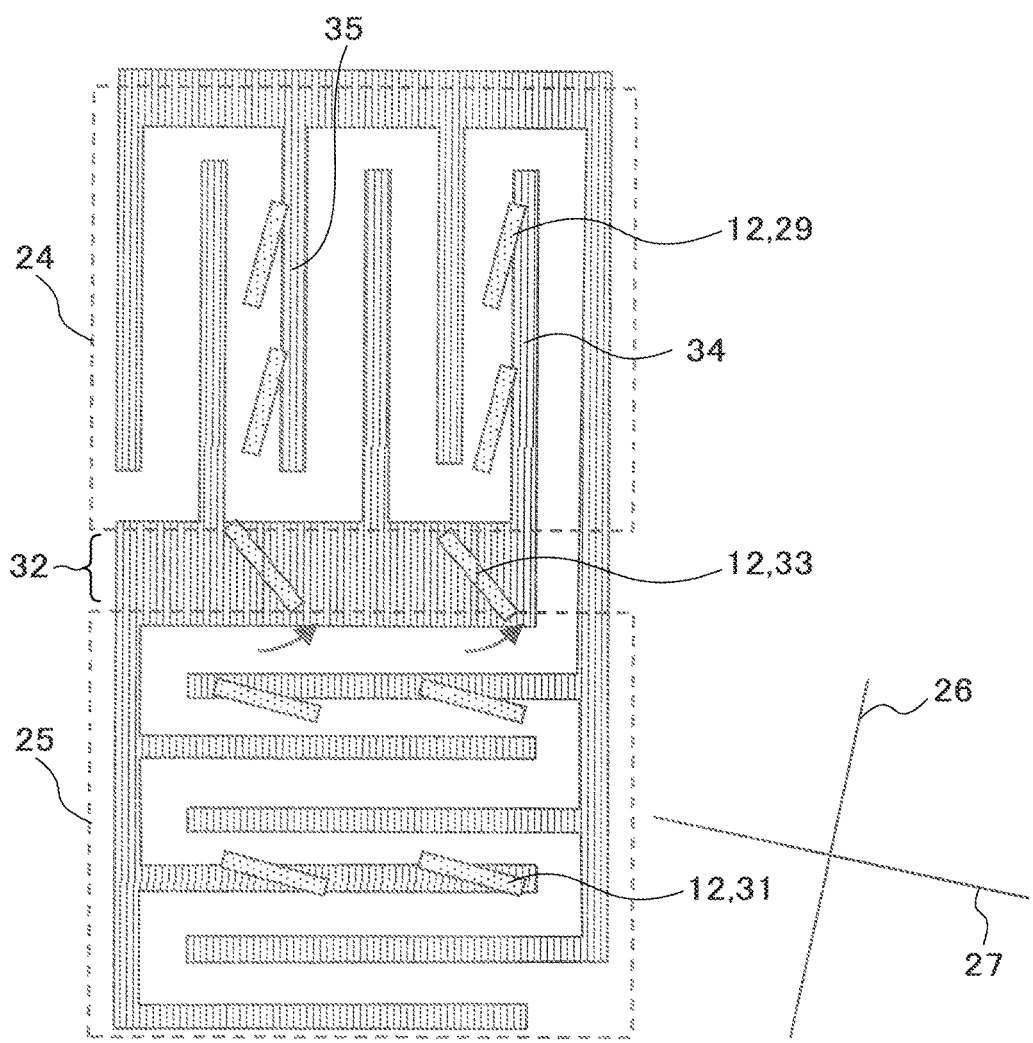
FIG. 18 is an enlarged plan view showing the alignment state of a boundary region and the vicinity thereof regarding one pixel in the liquid crystal display device according to the seventh exemplary embodiment.

A seventh exemplary embodiment of the present invention will be described by referring to FIG. 16, FIG. 17, and FIG. 18. FIG. 16 is a plan view of one pixel. FIG. 17 shows a sectional view taken along the line A-A' of FIG. 16. FIG. 18 shows a state where the initial alignment direction in a display region of the pixel is divided. The seventh exemplary embodiment will be described hereinafter in details by following the fabricating procedure.

First, 250 nm of chrome (Cr) is deposited as a first metal layer on the substrate 20 constituted with a first glass substrate, and patterns of the scan line 3 and the common signal wiring 2 are formed on the chrome. Subsequently, 400 nm of silicon nitride (SiNx) is deposited as a gate insulating film 13, 200 nm of amorphous silicon hydride (a-Si:H) and 50 nm of n-type amorphous silicon hydride (n-a-Si:H) are deposited in a stacked manner as a thin film semiconductor layer 6, and patterning is performed by leaving the thin film semiconductor layer 6 only in a TFT (thin film transistor) part to be a switching element of the pixel.

Furthermore, 250 nm of chrome is deposited as a second metal layer, and a part of patterns of the data line 4, the source electrode 7s as well as the drain electrode 7d of the TFT, and a pixel electrode 34 constituted with the second metal layer is formed on the chrome. Subsequently, the n-type amorphous silicon hydride (n-a-Si:H) of the thin film semiconductor layer 6 is removed by having the source electrode 7s and the drain electrode 7d of the TFT as the mask. Then, 600 nm of silicon nitride (SiNx) is deposited as a protection insulating film 14, and a through-hole 38 for connecting a pixel electrode 34 and a through-hole 37 for connecting a common electrode 35 are formed in the silicon nitride. Further, 80 nm of ITO is deposited thereon as a transparent electrode, and patterns of the pixel electrode 34 and the common electrode 35 are formed on the ITO. The pixel electrode 34 and the common electrode 35 are in a form in which a striped pattern is connected at both ends in a comb-like shape. The width of the pixel electrode 34 and the common electrode 35 is set as 3.5 μm, respectively, and the space between the pixel electrode 34 and the common electrode 35 is set as 7 μm.

The linear pattern of the comb-like electrodes constituted with the pixel electrode 34 and the common electrode 35 is extended in the longitudinal direction (the direction perpendicular to the scan line 3) in the region 24 as the region I in the upper half part of the pixel and extended in the lateral direction (the direction in parallel to the scan line 3) in the region 25 as the region II in the lower half part of the pixel so that both are orthogonal to each other in those regions. When the extending direction of the linear electrode in the region I is extended, it comes to meet the linear electrode in the region II. Further, a part 36 of the common electrode 35 shields the data line 4, the scan line 3, and the part between the scan line 3 and the common wiring 2. Through the method described above, the TFT array substrate 28 is formed.

In the first exemplary embodiment shown in FIG. 2, the liquid crystal 12 is rotated in the plane by the fringe electric field formed between the common electrode 1 that is formed in a flat form and the striped pixel electrode 5 disposed thereon via the gate insulating film 13 and the protection insulating film 14. In the meantime, in the seventh exemplary embodiment, the liquid crystal 12 is rotated in the plane by generating a lateral electric field between the comb-like pixel electrode 34 and the comb-like common electrode 35.

In the seventh exemplary embodiment, the initial alignment directions 29, 31 of the liquid crystal 12 in the regions 24, 25 are set in the direction rotated clockwise by 15 degrees with respect to the extending directions of the pixel electrode 34 and the common electrode 35 formed in the comb-like shape.

The other structures of the seventh exemplary embodiment are the same as those of the first exemplary embodiment. The absorption axis 26 of the incident-side polarization plate 22 is set to be the same as the initial alignment direction 29 of the region 24, and the absorption axis 27 of the exit-side polarization plate 23 is set to be orthogonal thereto. Further, the refractive index anisotropy Δn of the liquid crystal layer 12a is set as 0.075, and the thickness d is set as 4 μm. In this case, the extending direction of the comb-like pixel electrode 34 is set in the direction rotated counterclockwise from the initial alignment directions 29, 31 of the liquid crystal by 15 degrees both in the regions 24 and 25. Thereby, the liquid crystal 12 in the region 24 and 25 is rotated clockwise when an electric field is applied. In this case, it is desirable to set the initial alignment direction 33 of the boundary region 32 in the direction rotated counterclockwise from the initial alignment direction 29 of the region 24 at an acute angle as shown in FIG. 18.

The technique for achieving it is the same as that of the first exemplary embodiment, so that an explanation thereof will be provided by referring to FIG. 5A and FIG. 5B hereinafter. When determining the alignment directions by performing photoalignment in both of the TFT array substrate 28 and the color filter substrate 30, in the boundary region 32, the alignment direction of the region 24 in the TFT array substrate 28 is expanded by the alignment film 15a same as the region 24 while the alignment direction of the region 25 in the color filter substrate 30 is expanded by the alignment film 16b same as the region 25. In other words, in the boundary region 32, the alignment films 15a and 16b whose alignment processing directions are different by 90 degrees are formed. Further, through adding the clockwise chiral material 10 to the liquid crystal material, the initial alignment direction 33 in the boundary region 32 where the alignment films 15a and 16b are opposing to each other is fixed to the direction shown in FIG. 5B. In this case, the chiral pitch of the liquid crystal material is also set as 80 μm.

Since the initial alignment direction 33 in the boundary region 32 can thereby be determined uniquely, the alignment of the liquid crystal 12 is stabilized. This makes it possible to acquire a fine display. Further, when an electric field is applied between the comb-like pixel electrode 34 and the comb-like common electrode 35, the liquid crystal 12 in the boundary region 32 is rotated counterclockwise by the electric field working between the region 24 and the boundary region 32 and between the region 25 and the boundary region 32. Thus, the rotating direction of the liquid crystal 12 in the boundary region 32 becomes the same as the rotating directions of the liquid crystal 12 in each of the regions 24 and 25. Therefore, even when the liquid crystal 12 is rotated by applying an electric field, the alignment in the region 24, the boundary region 32, and the regions 25 becomes stable. Further, there is little chance of generating a domain abnormality even in a case where the display surface is pressed by a finger, for example, so that a fine display can be acquired.

While the present invention has been described above by referring to the specific exemplary embodiments shown in the accompanying drawings, the present invention is not limited only to each of the exemplary embodiments. Any changes and modifications occurred to those skilled in the art can be applied to the structures and the details of the present invention. Further, it is to be noted that the present invention includes combinations of a part of or the entire part of the structures of each of the exemplary embodiments combined mutually in an appropriate manner.

While a part of or the entire part of the exemplary embodiments can be summarized as in following Supplementary Notes, the present invention is not necessarily limited to those structures.

(Supplementary Note 1)

A lateral electric field type liquid crystal display device which includes two substrates opposing to each other, a liquid crystal layer which is sandwiched between the substrates and is constituted with liquid crystal aligned in a direction substantially in parallel to the substrates, and a linear electrode that generates a lateral electric field substantially in parallel to the substrates. The display device controls a display by rotating the liquid crystal in a plane substantially in parallel to the substrates by the lateral electric field, wherein:

each pixel constituting the display is divided into a region I, a region II, and a boundary region between the region I and the region II;

an initial alignment direction of the liquid crystal in the region I and an initial alignment direction of the liquid crystal in the region II are orthogonal to each other, an extending direction of the linear electrode in the region I and an extending direction of the linear electrode in the region II are orthogonal to each other, and the extending direction of the linear electrode of the region I comes to meet the linear electrode of the region II when extended; and an initial alignment direction of the liquid crystal in the boundary region is a direction rotated in a same rotating direction from the initial alignment direction of the region I at an acute angle.

(Supplementary Note 2)

The lateral electric field type liquid crystal display device as depicted in Supplementary Note 1, wherein the same rotating direction is a direction opposite from the rotating direction of the liquid crystal in the region I by the lateral electric field.

(Supplementary Note 3)

The lateral electric field type liquid crystal display device as depicted in Supplementary Note 1 or 2, wherein a chiral material is contained as a material of the liquid crystal.

(Supplementary Note 4)

The lateral electric field type liquid crystal display device as depicted in Supplementary note 3, wherein a chiral pitch of the chiral material is four times or more than thickness of the liquid crystal layer and is 200 μm or less.

(Supplementary Note 5)

The lateral electric field type liquid crystal display device as depicted in Supplementary Note 3 or 4, wherein:

in the boundary region, alignment processing directions in two interfaces between the liquid crystal layer and the two substrates are orthogonal to each other between the one interface and the other interface;

the alignment processing direction in the one interface is the same as one of the alignment processing directions of the region I and the region II; and the alignment processing direction in the other interface is the same as the other alignment processing direction of the region I and the region II.

(Supplementary Note 6)

The lateral electric field type liquid crystal display device as depicted in Supplementary Note 1 or 2, wherein:

in the boundary region, alignment processing directions in two interfaces between the liquid crystal layer and the two substrates are directions between the alignment processing direction of the region I and the alignment processing direction of the region II, and are substantially same directions.

(Supplementary Note 11)

A lateral electric field type liquid crystal display device including a liquid crystal layer which is sandwiched between two transparent insulating substrates and is constituted with liquid crystal aligned in an azimuth substantially in parallel to those substrates. The display device controls a display by transforming the liquid crystal by a lateral electric field substantially in parallel to the substrates, wherein:

two regions in which initial alignment directions of the liquid crystal are orthogonal to each other are provided, directions of the lateral electric fields in the two regions are orthogonal to each other as well, and an angle formed between an extending direction of a linear electrode that generates the lateral electric field and the initial alignment direction in one of the regions is equivalent to the angle in the other region; and a region (a boundary region) as a boundary between the two regions is included within a pixel, and in a case where the extending direction of the linear electrode in one of the regions comes to meet the linear electrode of the other region in the vicinity of the boundary region and the one region is defined as a region I while the other region is defined as a region II, the initial alignment direction in the boundary region is a direction rotated in one direction from the initial alignment direction of the region I at an acute angle.

(Supplementary Note 12)

The lateral electric field type liquid crystal display device as depicted in Supplementary Note 11, wherein the initial alignment direction of the boundary region is a direction rotated from the initial alignment direction of the region I at an acute angle to an opposite direction of the rotating direction of the liquid crystal by the lateral electric field in the region I.

The present invention can be utilized for a lateral electric field type active matrix liquid crystal display device and any apparatuses which use the liquid crystal display device.

What is claimed is:

1. A lateral electric field type liquid crystal display device, comprising:
   two substrates opposing to each other;
   a liquid crystal layer which is sandwiched between the substrates and is constituted with liquid crystal aligned in a direction substantially in parallel to the substrates;
   a linear electrode that generates a lateral electric field substantially in parallel to the substrates, the display device controlling a display by rotating the liquid crystal in a plane substantially in parallel to the substrates by the lateral electric field; and
   a common signal wiring separate from the linear electrode,
   wherein:
   each pixel constituting the display is divided into a region I, a region II, and a boundary region between the region I and the region II,
   an initial alignment direction of the liquid crystal in the region I and an initial alignment direction of the liquid crystal in the region II are orthogonal to each other, an extending direction of the linear electrode in the region I and an extending direction of the linear electrode in the region II are orthogonal to each other, and the extending direction of the linear electrode of the region I comes to meet the linear electrode of the region II when extended,
   an initial alignment direction of the liquid crystal in the boundary region is a direction rotated in a same rotating direction from the initial alignment direction of the region I at an acute angle, and
   the common signal wiring is disposed in the boundary region and is only disposed between the region I and the region II.

2. The lateral electric field type liquid crystal display device as claimed in claim 1, wherein the same rotating direction is a direction opposite from the rotating direction of the liquid crystal in the region I by the lateral electric field.

3. The lateral electric field type liquid crystal display device as claimed in claim 1, wherein a chiral material is contained as a material of the liquid crystal.

4. The lateral electric field type liquid crystal display device as claimed in claim 3, wherein a chiral pitch of the chiral material is four times or more the thickness of the liquid crystal layer and is 200 µm or less.

5. The lateral electric field type liquid crystal display device as claimed in claim 3, wherein:
   in the boundary region, alignment processing directions in two interfaces between the liquid crystal layer and the two substrates are orthogonal to each other between the one interface and the other interface,
   the alignment processing direction in the one interface is the same as one of the alignment processing directions of the region I and the region II, and
   the alignment processing direction in the other interface is the same as the other alignment processing direction of the region I and the region II.

6. The lateral electric field type liquid crystal display device as claimed in claim 1, wherein:
   in the boundary region, alignment processing directions in two interfaces between the liquid crystal layer and the two substrates are directions between the alignment processing direction of the region I and the alignment processing direction of the region II, and are substantially same directions.

7. The lateral electric field type liquid crystal display device as claimed in claim 1, wherein:
   in the boundary region, alignment processing directions in two interfaces between the liquid crystal layer and the two substrates are orthogonal to each other between the one interface and the other interface.

8. The lateral electric field type liquid crystal display device as claimed in claim 7, wherein:
   the alignment processing direction in the one interface is the same as one of the alignment processing directions of the region I and the region II, and
   the alignment processing direction in the other interface is the same as the other alignment processing direction of the region I and the region II.

* * * * *